United States Patent
Walker et al.

(10) Patent No.: US 6,356,878 B1
(45) Date of Patent: *Mar. 12, 2002

(54) CONDITIONAL PURCHASE OFFER BUYER AGENCY SYSTEM

(75) Inventors: Jay S. Walker, Ridgefield; Andrew S. Van Luchene, Norwalk; Daniel E. Tedesco; James A. Jorasch, both of Stamford; Thomas M. Sparico, Riverside, all of CT (US)

(73) Assignee: priceline.com Incorporated, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/997,170

(22) Filed: Dec. 22, 1997

Related U.S. Application Data

(63) Continuation-in-part of application No. 08/943,266, filed on Oct. 3, 1997, and a continuation-in-part of application No. 08/923,683, filed on Sep. 4, 1997, which is a continuation-in-part of application No. 08/889,319, filed on Jul. 8, 1997, which is a continuation-in-part of application No. 08/707,660, filed on Sep. 4, 1996.

(51) Int. Cl.[7] .............................................. G06F 17/60
(52) U.S. Cl. .......................... 705/26; 705/37; 705/39
(58) Field of Search ............................. 705/26, 27, 1, 705/5, 13, 15, 37, 35, 38; 295/226, 228, 236, 237, 239; 340/825.3

(56) References Cited

U.S. PATENT DOCUMENTS 3,573,747 A   4/1971   Adams et al.
3,581,072 A   5/1971   Nymeyer ..................... 705/37

(List continued on next page.)

FOREIGN PATENT DOCUMENTS

EP    512 702 A2   11/1992
WO    95/16971     6/1995

(List continued on next page.)

OTHER PUBLICATIONS

Lancorp Mortgage Services, http://www.lancorp-mortgage.com/retailpa.htm, 1998.

(List continued on next page.)

*Primary Examiner*—Vincent Millin
*Assistant Examiner*—Nicholas David Rosen
(74) *Attorney, Agent, or Firm*—Morgan & Finnegan, LLP

(57) ABSTRACT

A conditional purchase offer (CPO) buyer agency system is disclosed for processing variable conditional purchase offers (CPOs) containing at least one variable condition. If a posted CPO is not accepted by at least one seller for a predefined period of time, or has been rejected by all potential sellers, the terms of the posted CPO may be modified by the CPO buyer agency system, within the tolerances specified by the buyer in the variable CPO, to facilitate acceptance. A buyer can submit a variable CPO having two sets of conditions, namely, a first set and a second set of conditions, as well as the corresponding buyer-defined offer price for each condition set. In addition, the buyer preferably provides a set of rules to control the gradual posting of the condition sets between the first and second condition sets, as well as the appropriate adjustments to the corresponding offer price. A buyer can also submit a variable CPO having several predefined CPO sets, each with defined condition sets and corresponding offer prices, as well as a priority for their posting. If the highest priority CPO is not accepted, the next CPO in the prioritized list can be posted until a CPO is bound, all possibilities have been exhausted or the variable CPO has expired. A CPO rule application process monitors and modifies variable CPOs having a first set and a second set of conditions, and a CPO evaluation process monitors and modifies variables CPOs having predefined CPO condition sets.

33 Claims, 18 Drawing Sheets

U.S. PATENT DOCUMENTS

| | | | |
|---|---|---|---|
| 4,247,759 A | 1/1981 | Yuris et al. | |
| 4,449,186 A | 5/1984 | Kelly et al. | |
| 4,553,222 A | 11/1985 | Kurland et al. | |
| 4,677,552 A | 6/1987 | Sibley, Jr. | |
| 4,751,728 A | 6/1988 | Treat | |
| 4,789,928 A | 12/1988 | Fujisaki | |
| 4,799,156 A | 1/1989 | Shavit et al. | |
| 4,903,201 A | 2/1990 | Wagner | |
| 4,931,932 A | 6/1990 | Dalnekoff et al. | |
| 5,021,953 A | 6/1991 | Webber et al. | |
| 5,136,501 A | 8/1992 | Silverman et al. | |
| 5,168,446 A | 12/1992 | Wiseman | |
| 5,191,523 A | 3/1993 | Whitesage | |
| 5,191,613 A | 3/1993 | Graziano et al. | |
| 5,224,034 A | 6/1993 | Katz et al. | |
| 5,243,515 A | 9/1993 | Lee | |
| 5,253,165 A | 10/1993 | Leiseca et al. | |
| 5,262,941 A | 11/1993 | Saladin et al. | |
| 5,283,731 A | 2/1994 | Lalonde et al. | |
| 5,297,031 A | 3/1994 | Gutterman et al. | |
| 5,329,589 A | 7/1994 | Fraser et al. | |
| 5,331,546 A | 7/1994 | Webber et al. | 705/6 |
| 5,361,199 A | 11/1994 | Shoquist et al. | |
| 5,375,055 A | 12/1994 | Togher et al. | |
| 5,404,291 A | 4/1995 | Kerr et al. | |
| 5,420,914 A | 5/1995 | Blumhardt | |
| 5,426,281 A | 6/1995 | Abecassis | |
| 5,444,630 A | 8/1995 | Dlugos | |
| 5,467,269 A | 11/1995 | Flaten | |
| 5,500,793 A | 3/1996 | Deming, Jr. et al. | |
| 5,517,555 A | 5/1996 | Amadon et al. | |
| 5,519,769 A | 5/1996 | Weinberger et al. | |
| 5,553,131 A | 9/1996 | Minervino, Jr. et al. | |
| 5,557,517 A | 9/1996 | Daughterty, III | |
| 5,557,518 A | 9/1996 | Rosen | |
| 5,570,283 A | 10/1996 | Shoolery et al. | |
| 5,592,375 A | 1/1997 | Salmon et al. | |
| 5,606,602 A | 2/1997 | Johnson et al. | |
| 5,611,052 A | 3/1997 | Dykstra et al. | |
| 5,615,269 A | 3/1997 | Micali | |
| 5,664,115 A | 9/1997 | Fraser | |
| 5,689,652 A | 11/1997 | Lupien et al. | |
| 5,694,551 A | 12/1997 | Doyle et al. | |
| 5,696,965 A | 12/1997 | Dedrick | |
| 5,715,402 A | 2/1998 | Popolo | 705/37 |
| 5,717,989 A | 2/1998 | Tozzoli et al. | |
| 5,732,400 A | 3/1998 | Mandler et al. | |
| 5,745,882 A | 4/1998 | Bixler et al. | |
| 5,757,917 A | 5/1998 | Rose et al. | |
| 5,758,328 A | 5/1998 | Giovannoli | |
| 5,774,883 A | 6/1998 | Andersen et al. | 705/38 |
| 5,794,207 A | 8/1998 | Walker et al. | |
| 5,794,219 A | 8/1998 | Brown | |
| 5,797,127 A | 8/1998 | Walker et al. | |
| 5,799,285 A | 8/1998 | Klingman | |
| 5,809,478 A | 9/1998 | Greco et al. | 705/4 |
| 5,826,244 A | 10/1998 | Huberman | |
| 5,832,452 A | 11/1998 | Schneider et al. | |
| 5,835,896 A | 11/1998 | Fisher et al. | |
| 5,845,265 A | 12/1998 | Woolston | |
| 5,878,403 A | 3/1999 | DeFrancesco et al. | 705/38 |
| 5,905,975 A | 5/1999 | Ausubel | 705/37 |
| 6,131,087 A * | 10/2000 | Luke et al. | 705/26 |

FOREIGN PATENT DOCUMENTS

| | | |
|---|---|---|
| WO | 96/13013 | 5/1996 |
| WO | 96/34356 | 10/1996 |
| WO | 97/16797 | 5/1997 |
| WO | 97/46961 | 12/1997 |

OTHER PUBLICATIONS

Inland Mortgage Corporation, http://inlandmortgage.com/index.htm, 1998.

The Mortgage Store, http://www.mortgagestore.com, 1998.

Golden Age Antiques and Collectibles Online Auction, http://www.goldage.com, 1997.

Moran, Susan, "Xerox Won't Duplicate Past Errors", Business Week, Sep. 29, 1997.

Coleman, Zach, "Electronic Trading System Matches Buyers, Seller", Atlanta Business Chronicle, vol. 20; No. 12; p. 37A, Aug. 22, 1997.

"What's Holding Up E–Cash?", Cybernautics Digest, vol. 3; No. 7, Finance.

Resnick, Paul et al, "Roles For Electronic Brokers", http://ccs.mit.edu/CCSWP179.htm 1997.

Philatelists Online Information, http://www506.bonsai.com/q/@131354lhyljf/infop.html, 1997.

Sports trade Information, http://www.sportstrade.com/infos.html, 1997.

Numismatists Online Information, http://www.numismatists.com/info.html, 1997.

Sell and Trade Internet Marketplace, Sell and Trade, http://sellandtrade.com/script/main.asp, 1997.

Kay, Alan, "Chapter 7 Future Research", 1997.

Trade–direct, http/www.trade–direct.com, 1997.

"Internet Mortgage Service Eliminates Loan Agents and Passes Commisssions on to the Consumer", Yahoo! Finance, 1997.

Negroponte, Nicholas, "Pay Whom Per What When, Part 2", Negroponte, Issue 5.03, 1997.

"Ticketing revolution Could Triple Airline Profits, Analyst Says", Aviation Daily, vol. 325; No. 11; p. 87, 1996.

"Auctioning Unsold Airline Tickets", adapted extract from Insight (USA), The Global Ideas Bank, 1996.

Rockoff, Todd E., et al., "Design of an Internet–based system for remote Dutch auctions," Internet Research: Electronic Networking Applications and Policy, vol. 5, No. 4, pp. 10–16, 1995.

Franklin, Matthew K., et al., "The Design and Implementation of a Secure Auction Service," Proceedings: 1995 IEEE Symposium on Security and Privacy, pp. 2–14, 1995.

Tenenbaum, Jay M., et al., "CommerceNet: Spontaneous Electronic Commerce on the Internet," 1995 IEEE Spring Conference, pp. 38–43.

Sirbu, Marvin and Tygar, J.D., "NetBill: An Internet Commerce System Optimized for Network Delivered Services," IEEE 1995 Spring Conference, pp. 20–25.

Bunker, Ted, "How Auction Technology Sped And Enhanced Sale Of Radio Licenses," Investor's Business Daily, Executive Update, Regulation, p. A3, Feb. 24, 1995.

"AUCNET: The Story Continues", Harvard Business School, Jan. 17, 1995.

Anand, R., and Rao, M. Padmaja, "The Electronic Flea Market", IBM Research Division: Research Report, pp. 1–18, Jul. 28, 1994.

"Unusual Farmland Auction Set," Harrison Scott Publications, Liquidation Alert, Mar. 28, 1994.

"The Computer Museum brings auction block to cyberspace in First Internet Auction," Business Wire, Mar. 14, 1994.

Freeman, Brian and Gideon, Lidor, "Hosting Services— Linking the Information Warehouse To the Information Consumer," IEEE 1994 Spring Conference, pp. 165–171.

Booker, Ellis, "Mega real estate auction counts on imaging," Computerworld, p. 20, Dec. 7, 1992.

Abstract: "A forward/reverse auction algorithm for asymmetric assignment problems," Computational Optimization and Applications, Dec. 1992.

Abstract: "Marketel Shuts Doors," Travel Agent Magazine, Mar. 23, 1992.

Cass, Maxine, "West Coast Agents Remain Skeptical About New Air Ticket Sales Plan; Marketel: Airline ticket sales system sparks concern," Travel Agent Magazine, p. 50, Sep. 2, 1991.

Bookit!, "Airline Ticket Purchase Order For Business & Leisure Travel", Marketel International, Inc., 1991.

Inhaber, Herbert, "How To Solve the Problem of Siting Nuclear Waste," Transactions of the American Nuclear Society, vol. 62, Nov. 11–15, 1990.

Dyson, Esther, "Information, Bid and Asked," Forbes, Aug. 20, 1990.

"Mercado electronico, El chance de regatear por computador", CIENCIA Technologia E Informatica, Mar. 21, 1990 (Translation enclosed).

Cole, Jeff, "Fare bidding plan could be the ticket", St. Paul Pioneer Press Dispatch, Mar. 11, 1990.

Miller, Ross M., "The Design of Decentralized Auction Mechanisms that Coordinate Continuous Trade in Synthetic Securities," Journal of Economic Dynamics and Control, pp. 237–253, 1990.

"Business Briefing, Airline Seats May Go on the Auction Block", Insight on the news, Dec. 4, 1989.

"Business Travel Update, Automation", Travel Weekly, Nov. 27, 1989.

Munro, Don and McCann, David, "A New Way to Purchase Travel, Automated Service Would Let Companies Bid For Already–Filled Airline Seats", Business Travel News, Nov. 6, 1989.

"An Electronic Auction Ahead For Airline CRS's?", The Business Week Newsletter for Information Executives, Oct. 27, 1989.

Cohen, Danny, "Electronic Commerce," ISI Research Report, University of Southern California, Oct. 1989.

"From Airline Tickets to Human organs, the Electronic Markets are Booming", Times, vol. 3, No. 50, Aug. 14, 1989.

Coyne, Andrew, "Unbundling ideas may alter world of politics," The Financial Post (Toronto), Section 1, p. 11, Sep. 27, 1989.

Malone, Thomas W., et al., "Electronic Markets and Electronic Hierarchies," Communications of the ACM, vol. 30, No. 6, Jun. 1987.

"AUCNET: TV Auction Network System," Harvard Business School, Jul. 19, 1989.

Sammer, Harald W., "Online Stock Trading Systems: Study of an Application," IEEE 1987 Spring Conference, pp. 161–162.

Littlefair, T., "Homelink: a unique service," Computer Bulletin, pp. 12–14, Jun. 1986.

Banatre, Jean–Pierre, et al., "The Design and Building of Echere, a Distributed Electronic Marketing System," Communications of ACM, vol. 29, No. 1, Jan. 1986.

Turoff, Murray and Chinai, Sanjit, "An Electronic Information Marketplace," Elsevier Science Publishers B.V., pp. 79–90, 1985.

Banatre, Michel, "Distributed auction bidding system," IPC Business Press, Computer Communications, vol. 4, No. 4, Aug. 1981.

Koepper, Ken, "Room Inventory Auctioning: The Next CRS Generation", Lodging, Jan. 1990 at p. 26, 29–30.

Fishkin, Ken, Foresight Exchange Tutorial: (http://www.ideosphere.com/fx/docs/tutorial.html) Feb. 19, 1999 at p. 1–5.

"Bid.com 1998 Third–Quarter Revenue Increases 12.5 Percent From Second Quarter", Business Wire, Oct. 29, 1998.

Final Report: Virtual Hospital (http://www.telemed.medadmin.uiowa.edu/TRCDocs/Pubs/FinalReport/cVirtualH/virtualH/virtualh02.html), download date: Sep. 20, 1998.

"First Source Become a Member", More Reasons To Join First Source! (http://www.fsource.com/bene.html), download date: Sep. 20, 1998.

Jeffrey Davis, "Big Storm rising", Business 2.0, Sep., 1998 at p. 60.

Suite 101.com (http://www.suite101.com/doc.cfm.presskit/questions), 1998.

Web Marketing Today (http://www.wilsonweb.com/rfwilson/wmt2/issue36htm) dated Sep. 1, 1997, download date: Sep. 17, 1998.

"Free Stuff Internet Site Delivers for Viewers and Advertisers Alike", Press Release of PromoNet Interactive, Inc. dated Nov. 10, 1997.

About Iao, selected pages downloaded from www.iaoauction.com on Sep. 8, 1997 and Sep. 18, 1997.

Onsale: Auction Supersite, selected pages downloaded from www.onsale.com on Sep. 8, 1997.

Hapgood, Fred bidder Harvest, Sep. 1997, p. 58.

NASDAQ: What is NASDAQ?, selected pages downloaded from http://home.axford.com on Aug. 15, 1997.

NASDAQ Consolidated Subscriber Agreement, downloaded from www.pcquote.com/exchanges on Aug. 15, 1997.

TradingFloor: General Trading Information and Terms, downloaded from www.tradingfloor.com on Aug. 14, 1997.

HomeShark: Refinance Check, selected pages downloaded from www.homeshark.com on Aug. 13, 1997.

Hitch a Flight to Europe, selected pages downloaded from www.travelassist.com on May 6, 1997.

Airhitch: Your Way to Low Cost Travel, selected pages downloaded from www.vaportrails.com on May 6, 1997.

Kelsey, J. and Schneier, B., Conditional Purchase Orders, $4^{th}$ ACM Conference on Computer and Communications Security, ACM Press, 117–124 (Apr. 1997).

Bryant, Adam, "Shaking Up Air Fares' Status Quo", The New York Times, Mar. 31, 1997.

Silverman, Robert, "GM Drives Wed Ad Insertion Network", Inside Media, Feb. 26, 1997, vol. 9, No. 4, p. 1; ISSN:1046–5316.

"Flycast Introduces Unique 'Open Exchange' Match–Making Service", Interactive Marketing News, Feb. 21, 1997, vol. 4, No. 8.

"UK's World Telecom Unveils New WorldSaver Tariffs," Newsbytes, Information Access Company (Feb. 13, 1997).

"TransQuest and Web Ventures Deliver Internet Booking for Delta Air Lines", PR Newswire, Dec. 10, 1996, Financial News Section.

"Affinicast Enables Web Sites That Listen and Adapt to Customer Affinities", PR Newswire, Dec. 3, 1996.

"Web Ventures Presents BookIt!" press release printed from http://www/webventures.com/bookit/(Web Ventures World Wide Web site) on Dec. 2, 1996.

"World's First Real-Time Travel Auction Service to Be Available Via World Wide Web: ETA To Open Bidding to Consumers," Business wire, Dialog Trade & Industry Database (Nov. 4, 1996).

Gessel, Chris, "Trade Smarter: The Limit of Orders", Investor's Business Daily, Oct. 14, 1996, p. A1.

Crest: Cruise/Ferry Revenue Management System, selected pages downloaded from www.rtscorp.com on Aug. 5, 1996.

Nishimoto, Lisa, "Travel Services Are First Online Commerce Offerings to Fly," Infoworld, Jul. 29, 1996, downloaded from http://www.infoworld.com.

About Rate Hunter, dowloaded from http://207.49.64.77/rhprodrh.htm on Jul. 14, 1996.

Cathay Pacific Online Ticket Bidding, World Internet News Digest (May 8, 1996).

Sothbey's General Information, downloaded from www-.sothebys.com (1996).

CyberBid, Net Fun Ltd. (1996).

Nimmer, Raymond, T., "Electronic Contracting; Legal Issues", 14 J. Marshall J. Computer & Info L.211, Winter, 1996.

American Law Institute, Draft–Uniform Commerical Code Revised Article 2 (Sales), parts 2, 3, and 7, pp. 1–15, Jan. 4, 1996.

Speidel, Richard E. & Schott, Lee A., "Impact of Electronic Contracting on Contract Formation Under Revised UCC Article 2, Sales", C878 ALI–ABA 335, Dec. 9, 1993.

Hainer, Cathy and Grossman,Cathy Lynn, "Where Vacationing Kids Get Good Care", USA Today, Apr. 1, 1992, at p. 4D.

Del Russo, Laura, "Ticket–Bidding Firm Closes Its Door," Travel Weekly, Mar. 12, 1992.

"Newsletters", The Atlanta Constitution, Mar. 1, 1992, p. K13.

"CRTL's Blue Ribbon Deals for 1992", Consumer Reports Travel Letter, Jan. 1992, vol. 8, No. 1, at pp. 3–5.

Traveler's Notes; Bookit Report, Consumer Reports Travel Letter, Dec. 1991 at p. 143.

Feldman, Joan M., "To Rein In Those CRSs; Computer Reservation Systems", Air Transport World, Dec. 1991, at p. 89.

"Money Briefs; Buy Low, Fly High", Gannet News Service, Nov. 20, 1991.

"Buy Low, Fly High", USA Today, Nov. 14, 1991 at p. 15.

Traveler's Notes; Easier Airfare Bidding, Consumer Reports Travel Letter, Oct. 1991 at p. 119.

Nelson, Janet, "Practical Traveler; Airlines Relaxing Policy on No–Refund Tickets", The New York Times, Sep. 22, 1991 at p. 3 of Section 5.

Pelline, Jeff, "New Service; Now You Can Make a Bid on Your Next Airline Ticket Home", The Orange County Register, Sep. 1, 1991 at p. E01.

"Letter to Business Extra", The San Francisco Chronicle, Dec. 26, 1989 at p. C7.

Schrage, Michael, "An Experiment in Economic Theory; Labs Testing Real Markets", The Record Section B1, Nov. 26, 1989.

Schrage, Michael Innovation/Micheal Schrage: Laboratory Experiments with Market Economics, Los Angeles Times, Nov. 23, 1989 at p. D1.

Golden, Fran "AAL's Riga Doubts Marketel's Appeal to Retailers", Travel Weekly, Nov. 13, 1989.

Del Rosso, Laura, Firm Proposes ticket–bidding system; Marketel explores electronic auction of travel; Marketel International., Travel Weekly, Section No. 91, vol. 48, p. 1; Nov. 13, 1989.

Carlsen, Clifford, "Polaris Group Set to Fly the Leveraged Sky", San Francisco Business Times, Nov. 6, 1989 at p. 1.

Kuttner, Robert, "Computers May Turn the World into One Big Commodities Pit", Business Week, Sep. 11, 1989.

Carlsen, Clifford, "From Airline Tickets to Human Organs, the Electronic Markets Are Booming", San Francisco Business Times, Aug. 14, 1989 at p. 17.

"Public May Subunit Bids To Get Bargin Rates", Wall Street Journal, Section 2; p. 1, Column 1; Aug. 1, 1989.

American Airlines Internet Silent Auction, selected pages downloaded from www.americanair.com.

Apollo Host Computer, selected pages downloaded from www.appollo.com.

"Auctioning unsold airline tickets." (http://www.new-civ.org/GIB/BOV/BV–409.HTMI), at p. 1.

Cathay Pacific:CyberTraveler Auction #3—Official Rules, selected pages downloaded from www.cathaypacific.com.

CMS Online: About Collector's Super Mall downloaded from www.csmonline.com.

Sabre Decision Technologies, selected pages downloaded from www.sabre.com.

PhoneMiser:Frequently Asked Questions, downloaded from www.phonemiser.com.

The United Computer Exchange: How It All Works, selected pages downloaded from www.uce.com.

Tired of Shopping For the Best Home Loan?, Mortgage Loan Specialists.

About IAO, selected pages downloaded from www.iaoauction.com on Sep. 8, 1997 and Sep. 18, 1997.

Classifieds2000: The Internet Classifieds, selected pages downloaded from www.classifieds2000.com on Aug. 6, 1997.

Laura Del Rosso, Marketel Says It Plans to Launch Air Fare 'Auction' in June; Marketel International, Inc., Travel Weekly, Apr. 29, 1991, at 1.

Laura Del Rosso, Ticket–Bidding Firm Closes its Doors: Marketel International, Inc., Travel Weekly, Mar. 12, 1992, at 1.

Fran Golden, AAL's Riga Doubts Marketel's Appeal to Retailers; Chris Riga of American Airlines, Travel Weekly, Nov. 13, 1989, at 4.

Robert Kuttner, Computers May Turn the World Into One Big Commodities Pit, Business Week, Sep. 11, 1989, at 17.

Jeff Pelline, *Travelers Bidding on Airline Tickets; SF Firm Offers Chance for Cut Rate Fares,* The San Francisco Chronicle, Aug. 19, 1991, (News) at A4.

The United Computer Exchange: How It All Works, selected pages downloaded from www.uce.com on Jul 23, 1997.

* cited by examiner

POSTED CPO DATABASE 500

| CPO NUMBER 540 | EXPIRATION DATE 545 | STATUS 550 | SUBJECT 555 | PRICE 560 | CONDITIONS 565 | BUYER IDENTIFIER 570 |
|---|---|---|---|---|---|---|
| 4568 | 9/16/97 2:48 PM | COMPLETED | AIRLINE TICKETS | $600 | ROUNDTRIP JFK TO LAX, LEAVE 10/1, RETURN 10/7 BUSINESS CLASS | 222222 |
| 2387 | 9/15/97 12:00 AM | COMPLETED | CAR RENTAL | $225 | ORLANDO MID-SIZE 10/1 - 10/7 | 444444 |
| 6874 | 9/16/97 12:00 AM | PENDING | HOTEL ROOM | $360 | GREATER HOUSTON AREA ECONOMY ROOM 10/1-10/7 | 333333 |
| 7782 | 9/19/97 4:48 PM | PENDING | HOTEL ROOM | $400 | NEW YORK SUITE 10/15-10/20 | 555555 |

SYSTEM DATE/TIME 502
9/15 12:00 AM

FIG. 5

BUYER DATABASE 600

| BUYER IDENTIFIER 625 | NAME 630 | ADDRESS 635 | CREDIT CARD ACCOUNT NUMBER 640 | CPO NUMBER(S) 645 |
|---|---|---|---|---|
| 222222 | JOHN SMITH | 3 MAIN ST. | 2222-2222-2222-2222 | 4568 |
| 333333 | SUE JOHNSON | 4 PINE ST. | 3333-3333-3333-3333 | 6874 |
| 444444 | DAVE McCARTHY | 6 TEMPLE ST. | 4444-4444-4444-4444 | 2387 |
| 555555 | TIM JONES | 2 RIVER PLACE | 5555-5555-5555-5555 | 7782 |

SELLER DATABASE 700

| SELLER IDENTIFIER 735 | SELLER NAME 740 | CPO TRACKING NUMBER 745 |
|---|---|---|
| 67676 | AMERICAN AIRLINES | 4568 |
| 89898 | DELTA AIRLINES | N/A |
| 45454 | AVIS | 2387 |
| 42929 | HERTZ | N/A |
| 81818 | SHERATON | N/A |
| 47474 | HILTON | N/A |

FIG. 7

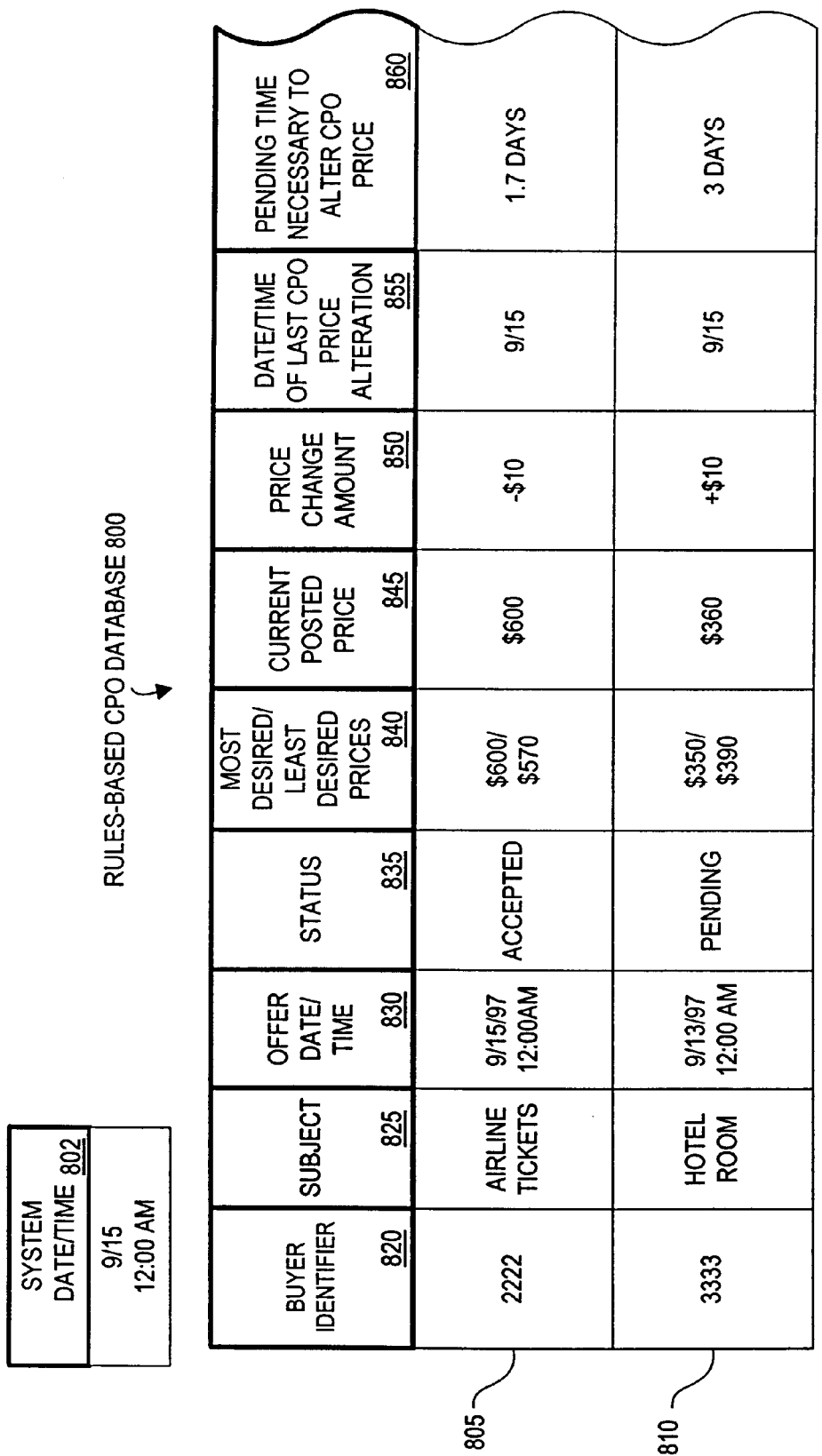

RULES BASED CPO DATABASE 800 (CONTINUED)

| MOST DESIRED CONDITIONS 865 | LEAST DESIRED CONDITIONS 870 | CONDITION PRIORITY 875 | LAST CONDITION PRIORITY ALTERED 880 | DATE/TIME OF LAST CPO CONDITION ALTERATION 885 | PENDING TIME NECESSARY TO ALTER CPO CONDITIONS 890 | CURRENT OFFER EXPIRATION DATE/TIME 895 | MASTER EXPIRATION DATE 898 |
|---|---|---|---|---|---|---|---|
| ROUND TRIP JFK-LAX | ROUND TRIP JFK-LAX | 1 | NO CONDITIONS ALTERED YET | | 1.7 DAYS | 9/16/97 2:48PM | 9/20/97 |
| LEAVE 10/1, RETURN 10/9 | LEAVE 9/25, RETURN 10/9 | 2 | | | | | |
| BUS. CLASS | FIRST CLASS | 3 | | | | | |
| GREATER HOUSTON AREA | DOWNTOWN HOUSTON | 1 | 3 | 9/15/97 | 3 DAYS | 9/18/97 12:00 AM | 9/24/97 |
| ECONOMY ROOM | NORMAL ROOM | 2 | | | | | |
| 9/30-10/10 | 10/1-10/7 | 3 | | | | | |

FIG. 8B

CPO DATABASE 900

| BUYER IDENTIFIER 920 | CPO NUMBER 925 | OFFER DATE 930 | SUBJECT 935 | PRICE 940 | CONDITIONS 945 | CONDITION/ PRICE SET PRIORITY 950 | STATUS 955 | CURRENT CONDITION/ PRICE SET POSTED 960 | PENDING TIME NECESSARY TO POST NEW CONDITION / PRICE SET 965 | CURRENT CPO EXPIRATION DATE/TIME 970 | MASTER EXPIRATION DATE 975 |
|---|---|---|---|---|---|---|---|---|---|---|---|
| 4444 | 2387 | 9/9 | CAR RENTAL | $250 | ORLANDO LUXURY 10/1-10/9 | 1 | UNACCEPTED | 2 | 6 DAYS | 9/15/97 12:00 AM | 9/27/97 |
| | | | | $225 | ORLANDO MIDSIZE 10/1-10/9 | 2 | ACCEPTED | | | | |
| | | | | $200 | ORLANDO COMPACT 10/1-10/9 | 3 | N/A | | | | |
| 5555 | 7782 | 9/15 | HOTEL ROOM | $400 | NEW YORK SUITE 10/15-10/20 | 1 | PENDING | 1 | 4.7 DAYS | 9/19/97 4:48 PM | 9/29/97 |
| | | | | $450 | NEW YORK SUITE 10/15-10/20 | 2 | N/A | | | | |
| | | | | $350 | NEW YORK ECONOMY 10/15-10/20 | 3 | N/A | | | | |

SYSTEM DATE/TIME 902
9/15 12:00 AM 905
910

CONDITIONAL PURCHASE OFFER BUYER AGENCY SYSTEM

CROSS-REFERENCE TO RELATED APPLICATIONS

This application is a continuation-in-part of U.S. patent application Ser. No. 08/923,683, filed Sep. 4, 1997 and U.S. patent application Ser. No. 08/943,266, filed Oct. 3, 1997, each of which are continuation-in-parts of U.S. patent application Ser. No. 08/889,319, filed Jul. 8, 1997, which is a continuation-in-part of U.S. patent application Ser. No. 08/707,660, filed Sep. 4, 1996, each incorporated by reference herein.

FIELD OF THE INVENTION

The present invention relates generally to a system for buying goods and services, and more particularly, to a method and system for administering the purchase of such goods and services by customers who have submitted one or more purchase offers for the purchase of such items.

BACKGROUND OF THE INVENTION

Most systems for processing the sale of products are seller-driven, whereby the seller prices, packages, configures and offers a product for sale, and the buyer decides whether or not to accept the seller's offer. In a buyer-driven system, on the other hand, the buyer dictates the terms of the offer and one or more sellers decide whether or not to accept. A "help wanted" advertisement, for example, is a buyer-driven inquiry since an employer is looking to locate and buy the services of a qualified employee. The inquiry is advertised to a large number of potential employees, who may respond by submitting their resumes to the prospective employer.

The parent and grandparent applications to the present application disclose a buyer-driven Conditional Purchase Offer (CPO) Management System that processes binding purchase offers received from individual consumers. The purchase offers contain one or more buyer-defined conditions for the purchase of goods or services, at a buyer-defined price. The purchase offers are typically guaranteed by a general-purpose financial account, such as a debit or credit account, and thereby provide sellers with a mechanism for collecting payment from the consumer. The purchase offers are provided by the CPO Management System to sellers, for individual sellers to either accept or reject. If a seller accepts a purchase offer, the CPO Management System binds the buyer on behalf of the accepting seller, typically by charging the general-purpose financial account designated by the buyer or providing the account information to the accepting seller for processing, to form a legally binding contract. Thus, the CPO Management System empowers individual consumers to obtain goods and services, such as travel or insurance services, at prices which are set by the consumers. The CPO Management System provides numerous commercial advantages to sellers as well. For example, the CPO Management System permits individual sellers to effectively sell excess capacity when actual demand fails to meet forecasted demand. In particular, the CPO Management System provides an effective mechanism for sellers to be confident that if they accept a consumer's offer, the consumer will purchase the requested goods or services at the agreed-upon price. Yet, the consumer remains unable to use the information to ascertain the seller's underlying level of price flexibility, which, if known to a seller's competitors or customers, could dramatically impact the seller's overall revenue structure.

U.S. patent application Ser. No. 08/889,319, the grandparent application to the present application, discloses a CPO Management System that permits sellers to provide proprietary rules for the acceptance of CPOs. Each of these rules establishes one or more restrictions which the seller is willing to accept for a predefined minimum price. The rules are utilized by the CPO Management System to determine whether to accept, reject or counter a CPO on behalf of a particular seller. In this manner, the CPO Management System can respond to submitted CPOs in real-time on behalf of sellers, with a minimal amount of expensive, time consuming and error prone human intervention.

For many transactions, the embodiments of the CPO Management Systems discussed above, and more fully in the parent and grandparent applications, will effectively complete transactions between buyers and sellers, with minimal intervention by the parties once the CPO has been submitted. The performance of the CPO Management System depends, at least in part, upon its utilization by a large number of both buyers and sellers. Specifically, buyers are more likely to submit purchase offers if they know the purchase offers will be reviewed by a sufficiently large number of sellers. Likewise, sellers are more likely to review offers if a sufficiently large number of offers are submitted. In addition to being a lost business opportunity, purchase offers which are not accepted represent a waste of time and effort by both buyers and sellers. Thus, buyers and sellers alike will be frustrated and discouraged from utilizing the CPO Management System if the acceptance rate for submitted purchase offers does not meet acceptable levels.

Invariably, some buyers will submit purchase offers that are not initially accepted by any seller, typically because the price offered by the buyer is too low. While a purchase offer may not be acceptable as originally posted, buyers and sellers alike would benefit if the purchase offer could be modified over time to increase the likelihood that the CPO will be acceptable to at least one seller. The above-referenced CPO Management Systems do permit buyers to submit a CPO having a range of acceptable conditions, such as a three (3) day acceptable departure period for air travel at a specified price. Once submitted, however, the CPO is generally posted to sellers with the entire range of acceptable conditions in a "take it or leave it" manner. Thus, if a posted CPO is not accepted by any seller, the buyer's only option is to obtain the desired item elsewhere (generally at a higher price) or to start over and submit a new CPO, having either different conditions and an associated offer price, or the same conditions at a higher price.

While many buyers in the above example may be satisfied with any flight within the specified three (3) day departure window, a number of buyers may prefer departures at certain times of day within the three (3) day departure window, and may be willing to pay a premium to obtain such a flight. Likewise, for buyers primarily motivated by price, it is desirable to initially post a CPO with the entire range of acceptable conditions, in an attempt to obtain a lower price as the reward for such flexibility. With present systems, however, the buyer is unable to dynamically post successive CPOs having an appropriate balance between the flexibility of posted conditions and the associated offer price.

Online auctions, such as those sponsored by eBay/AuctionWeb, Best Internet Communications or OpenSite, allow a bidder to set a maximum bid and have the actual bid automatically increased over time, in fixed increments, up to the maximum bid amount. Such auctions, however, do not allow the bidder to dynamically trade off price for product quality or other product characteristics. In other words, the auctions only permit buyers to increase their bid on the same product. In addition, adjustable price increments are not set by the bidder.

As apparent from the above deficiencies with conventional systems for buying and selling goods and services, such as airline tickets, a need exists for a system that permits buyers to submit variable CPOs containing at least one variable condition to allow the CPO to be modified over time, within the tolerances specified by the buyer in the variable CPO. A further need exists for a buyer agency system that allows a buyer to submit a variable CPO having two variable sets of conditions (first and second) and a set of rules to control the gradual posting of the condition sets between the first and second condition sets, as well as the appropriate adjustments to the corresponding offer price. Yet another need exists for a buyer agency system that allows a buyer to submit a variable CPO having several CPOs, each with defined condition sets and corresponding offer prices, as well as a priority for their posting.

SUMMARY OF THE INVENTION

Generally, according to one aspect of the invention, a conditional purchase offer (CPO) buyer agency system is disclosed for processing variable conditional purchase offers (CPOs) containing at least one variable condition. If a posted CPO is not accepted for a predefined period of time, or has been expressly rejected by all potential sellers, the terms of the posted CPO may be modified by the CPO buyer agency system, within the tolerances of the variable CPO, to facilitate acceptance. A variable CPO is a binding offer containing at least one variable condition submitted by a buyer for the purchase of an item, within a buyer-specified price range. A variable condition contains either a range of values or both an initial value and at least one alternate value therefor. A different buyer-defined price may be specified for each possible combination of conditions.

The disclosed conditional purchase offer (CPO) buyer agency system serves as an agent for the buyer and allows a buyer to submit multiple purchase offers at one time. The multiple CPOs may be provided to sellers sequentially or simultaneously. When purchase offers are provided to sellers sequentially, the buyer may control the timing and priority in which the purchase offers are provided to the sellers. When multiple purchase offers are provided to sellers simultaneously, remaining related CPOs should be cancelled, once one of the simultaneously posted CPOs is accepted.

The buyer may specify the variable CPO in a number of ways. In one embodiment, referred to herein as the "Variable Condition Sets Embodiment," a buyer submits a variable CPO by specifying a first condition set and a second condition set, as well as the corresponding buyer-defined offer price for each condition set. In addition, the buyer can provide the CPO buyer agency system with a set of rules to control the gradual posting of the condition sets between the first and second condition sets, as well as the appropriate adjustments to the corresponding offer price. Under the "Variable Condition Sets Embodiment," the first condition set is initially posted and one variable condition within the first condition set is changed to a value corresponding to the second condition set for each time period, in a predefined sequence based on a condition priority established by the buyer, until the posted CPO is accepted.

In another embodiment, referred to herein as the "Predefined CPO Condition Sets Embodiment," a buyer may specify a variable CPO containing several distinct CPOs, each with a defined condition set and corresponding offer price, as well as a priority for their posting. Under the "Predefined CPO Condition Sets Embodiment," a buyer can submit a variable CPO containing several CPOs, each with a defined condition set and corresponding offer price, as well as a priority for their posting. Thus, if the buyer's highest priority CPO is not accepted within a predefined period of time, or is expressly rejected by all potential sellers, the CPO buyer agency system posts the next CPO in the prioritized list until a CPO is bound, all possibilities have been exhausted or the variable CPO has expired.

The CPO buyer agency system may periodically execute a CPO rule application process and a CPO evaluation process to monitor variable CPOs and to modify the terms of the posted CPO, within the tolerances specified by the buyer in the variable CPO, if the posted CPO has not been accepted by at least one seller within a predefined period of time, or has been expressly rejected by all potential sellers. The CPO rule application process monitors and modifies variable CPOs having a first set and a second set of conditions, and the CPO evaluation process monitors and modifies variables CPOs having predefined CPO condition sets.

A more complete understanding of the present invention, as well as further features and advantages of the present invention, will be obtained by reference to the following detailed description and drawings.

BRIEF DESCRIPTION OF THE DRAWINGS

FIG. 5 illustrates a sample table from the posted CPO database of FIG. 2;

FIG. 6 illustrates a sample table from the buyer database of FIG. 2;

FIG. 7 illustrates a sample table from the seller database of FIG. 2;

FIGS. 8A and 8B, collectively, illustrate a sample table from the rules-based CPO database of FIG. 3;

FIG. 9 illustrates a sample table from the CPO database of FIG. 3;

DETAILED DESCRIPTION

Figure 1:
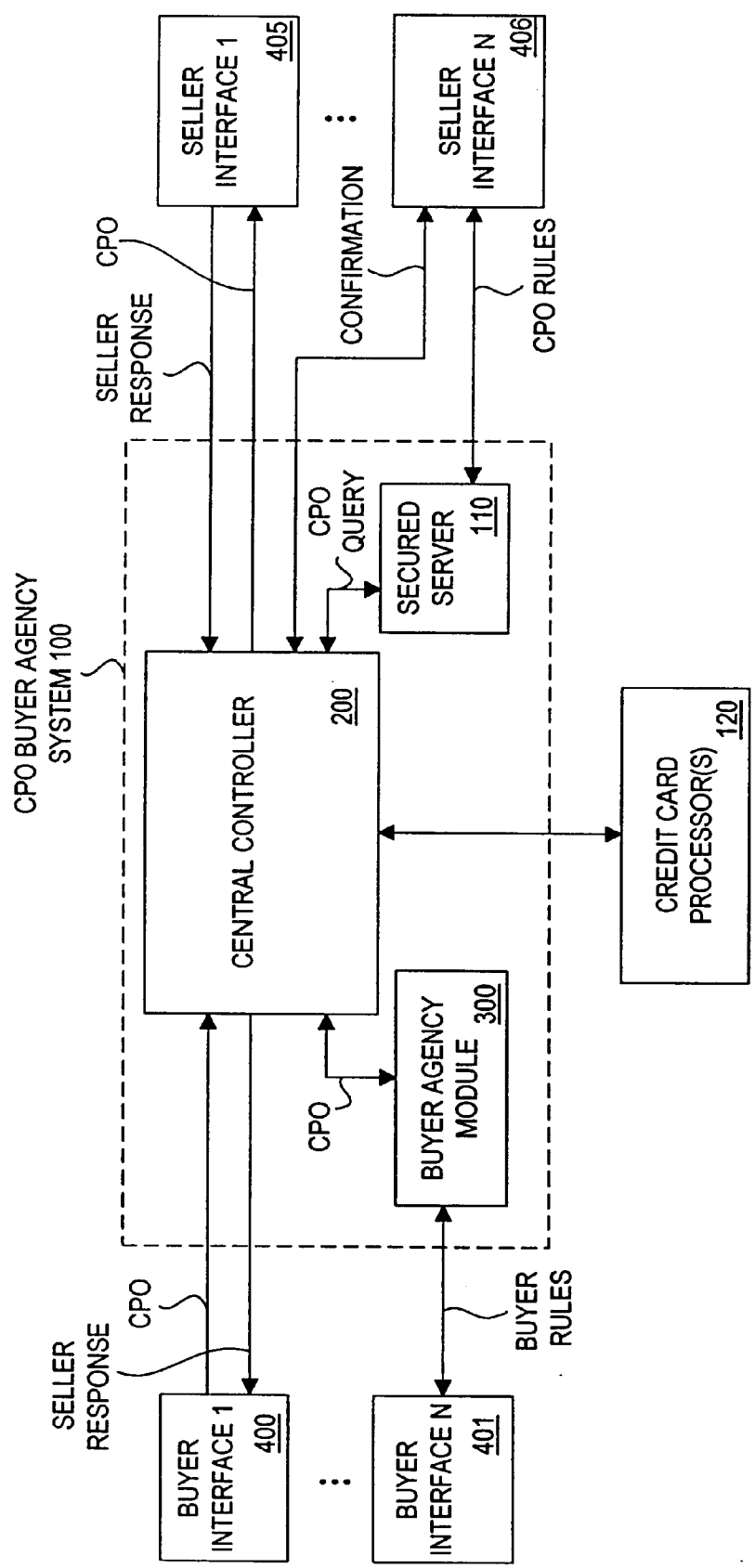
FIG. 1 is a schematic block diagram illustrating a CPO buyer agency system in accordance with one embodiment of the present invention.

FIG. 1 shows a conditional purchase offer (CPO) buyer agency system 100 for receiving variable conditional purchase offers (CPOs) containing at least one variable condition from one or more buyers, using buyer interfaces 400–401, discussed further below in conjunction with FIG. 4. According to a feature of the present invention, the CPO buyer agency system 100 processes each received variable CPO and generates at least one CPO to be posted to one or more sellers, utilizing seller interfaces 405–406. The posted CPO contains a set of conditions satisfying the variable conditions specified by the buyer in the variable CPO. The CPO buyer agency system 100 determines whether one or more sellers are willing to accept a given posted CPO. If a posted CPO has not been accepted by at least one seller within a predefined period of time, or has been expressly rejected by all potential sellers, the terms of the posted CPO may be modified by the CPO buyer agency system 100, within the tolerances specified by the buyer in the variable CPO, to facilitate acceptance. As discussed further below, if a seller accepts a given posted CPO, the CPO buyer agency system 100 binds the buyer on behalf of the accepting seller, thereby forming a legally binding contract, consistent with the terms of the posted CPO.

As used herein, a variable CPO is a binding offer containing at least one variable condition submitted by a buyer for the purchase of an item, within a buyer-specified price range. As discussed below, the variable CPO may be guaranteed, for example, using a general-purpose financial account, such as a credit or debit account, maintained by a financial institution. Once a seller accepts the offer, the buyer is bound by the conditional purchase offer (CPO) buyer agency system 100 transferring payment from the general-purpose financial account previously designated by the buyer to the accepting seller (or transferring an indication of the general-purpose account itself to the seller for processing). Thus, even if the buyer ultimately fails to proceed with the transaction following acceptance of the CPO by a seller, the general-purpose account designated by the buyer will be charged the full value or a penalty.

A variable condition contains either a range of values or both an initial value and at least one alternate value therefor. A different buyer-defined price may be specified for each possible combination of conditions. The disclosed conditional purchase offer (CPO) buyer agency system 100 allows a buyer to submit multiple purchase offers at one time. The multiple CPOs may be provided to sellers sequentially or simultaneously. In addition, when purchase offers are provided sequentially, the buyer may control the timing and priority in which the purchase offers are provided to the sellers.

The buyer may specify the variable CPO in a number of ways. In one embodiment, referred to herein as the "Variable Condition Sets Embodiment," a buyer submits a variable CPO by specifying a first condition set and a second condition set, as well as the corresponding buyer-defined offer price for each condition set. In addition, the buyer can provide the CPO buyer agency system 100 with a set of rules to control the gradual posting of the condition sets between the first and second condition sets, as well as the appropriate adjustments to the corresponding offer price. In another embodiment, referred to herein as the "Predefined CPO Condition Sets Embodiment," a buyer may specify a variable CPO by submitting several CPOs, each with defined condition sets and corresponding offer prices, as well as a priority for their posting.

In one implementation of the "Variable Condition Sets Embodiment," discussed further below, the first condition set is initially posted, and one variable condition within the condition set is changed to the second condition value for each time period, in a predefined sequence based on a condition priority established by the buyer, until the posted CPO is accepted. The CPO buyer agency system 100 adjusts the offer price for each condition set variation or the offer price can remain constant for one or more condition set variations, if specified by the buyer.

Thus, the Variable Condition Sets embodiment permits buyers to identify their "ideal" conditions as their first condition set, for example, with a corresponding maximum price (less flexible/higher price start point). If the first condition set is not accepted, the condition set is reconfigured with one or more conditions adjusted to the second (or more flexible) condition, with an appropriate price reduction. Likewise, the Variable Condition Sets embodiment permits buyers, for example, with "more time than money," to identify their broadest or most flexible conditions as their first condition set, with a corresponding low starting price (more flexible/lower price start point). If the first condition set is not accepted, the condition set is reconfigured with one or more conditions adjusted to the second (or less flexible) condition, with an appropriate price increase.

For example, if a buyer submits a variable CPO by specifying two variable condition sets having three prioritized variable conditions, the CPO buyer agency system 100 initially posts a CPO with each of the three conditions having the values associated with the first condition set. If the posted CPO remains unaccepted after a predefined period of time, the CPO buyer agency system 100 changes the posted value of the lowest priority condition to the value associated with the second condition set, and leaves the two conditions having the highest priority unaltered. Thereafter, the value of one individual condition is changed for each time period to the value associated with the second condition set, until each of the conditions have the value associated with the second condition set, or until the CPO is accepted or expired.

In the "Predefined CPO Condition Sets Embodiment," a buyer may specify a variable CPO containing several CPOs, each with a defined condition sets and a corresponding offer price, as well as a priority for their posting. In this manner, if the buyer's highest priority CPO is not accepted within a predefined period of time, or is expressly rejected by all potential sellers, the CPO buyer agency system 100 posts the next CPO in the prioritized list until a CPO is bound, all possibilities have exhausted or the variable CPO has expired.

In the "Predefined CPO Condition Sets Embodiment," two or more multiple individual CPOs within the scope of a single variable CPO can simultaneously be provided to sellers. Once a CPO is accepted, the status of the remaining posted individual CPOs, as well as the overall variable CPO, are adjusted to reflect the acceptance of the first individual CPO and the cancellation of any simultaneously pending related CPOs. For example, each of the condition sets and corresponding prices can be separately posted as individual CPOs until one of the individual CPOs is accepted.

Although the CPO buyer agency system 100 is illustrated herein as a system for selling travel related products, the CPO buyer agency system 100 could be utilized to facilitate the purchase and sale of any good or service, such as automobiles, insurance, computer equipment, or telephone service, as would be apparent to a person of ordinary skill. For a more detailed discussion of a general CPO management system for selling such items, see U.S. patent application Ser. No. 08/707,660, filed Sep. 4, 1996, the great-grandparent application to the present application, which is incorporated by reference herein.

CPO BUYER AGENCY SYSTEM

As shown in FIG. 1, the CPO buyer agency system 100 includes a central controller 200, discussed further below in conjunction with FIG. 2, one or more buyer agency modules 300, discussed further below in conjunction with FIG. 3, for communicating with buyer interfaces, such as the buyer interface 401, and one or more secured servers 110 for communicating with one or more seller interfaces, such as the seller interface 406. The CPO buyer agency system 100 may provide a given CPO to selected sellers based on the industry associated with the CPO or other predefined screening criteria, so that sellers only obtain CPOs that they may be interested in or are authorized to screen. Alternatively, the CPO buyer agency system 100 may provide all CPOs to all sellers for screening.

According to one feature of the present invention, the CPO buyer agency system 100 provides an optional agency feature that permits the CPO buyer agency system 100 to accept or reject a given posted CPO on behalf of certain agency-based sellers who have delegated such authority to the CPO buyer agency system 100. Thus, the CPO buyer agency system 100 provides two distinct operating modes in that it (i) evaluates CPOs on behalf of certain agency-based sellers who have delegated authority to the CPO buyer agency system 100 to accept or reject a given CPO, and (ii) permits broadcast-based sellers to evaluate CPOs independently. Thus, the CPO buyer agency system 100 can provide one or more CPOs to each broadcast-based seller, for the sellers to independently determine whether or not to accept a given CPO. It is noted that the CPO buyer agency system 100 can provide a CPO to each appropriate broadcast-based seller, for example, by means of a broadcast transmission, or by means of posting the CPO, for example, on an electronic bulletin board accessible by each broadcast-based seller. Alternatively, the CPO buyer agency system 100 can evaluate one or more CPOs against a number of CPO rules defined by one or more agency-based sellers, to decide on behalf of an agency-based seller to accept or reject a given CPO. Thus, the CPO buyer agency system 100 can determine if one or more sellers accepts a given CPO by providing the CPO to each seller and receiving an acceptance, rejection or counteroffer, or by applying the CPO to the CPO rules to render a decision to either accept, reject or counter a CPO on behalf of a particular seller.

As discussed further below, a CPO rule is a set of restrictions defined by a given agency-based seller, to define a combination of such restrictions for which the seller is willing to accept a CPO. For a more detailed discussion of CPO rules, the manner in which they are generated and related security issues, see U.S. patent application Ser. No. 08/889,319, entitled Conditional Purchase Offer Management System, filed Jul. 8, 1997, the grandparent application to the present application, which is incorporated by reference herein. Each secured server 110 may be associated with one or more sellers and each secured server 110 stores, among other things, the CPO rules defined by associated sellers. Each secured server 110 may be remotely located from the central controller 200, as shown in FIG. 1, or may be integrated with the central controller 200. In remote embodiments, the secured server 110 associated with each seller may be physically located at a processing facility secured by the particular seller or at the physical location of a third party.

The CPO rules contain sensitive information, including, for example, the seller's price flexibility and available capacity, which, if known to a seller's competitors or customers, could dramatically impact the seller's overall revenue structure. Thus, according to a feature of the present invention, the CPO rules may be securely stored by each server 110, to prevent one seller from accessing, obtaining or altering the CPO rules of another seller. In one embodiment, the secured servers 110 utilize computer security techniques, such as database access control mechanisms. In this manner, the integrity and confidentiality of the CPO rules can be maintained in the otherwise potentially hostile computing environment.

As discussed further below, each buyer or his agent contacts the CPO buyer agency system 100, for example, by means of telephone, facsimile, online access, e-mail, or in-person contact with an operator of the system 100, and provides the CPO buyer agency system 100 with the terms of his CPO or variable CPO (including buyer rules to control the gradual posting of the condition sets between the first and second condition sets, if appropriate). In one embodiment, buyers submit variable CPOs to one or more buyer agency modules 300, discussed below in conjunction with FIG. 3, and each buyer agency module 300 processes each received variable CPO and provides a CPO to the central controller 200 for posting to the sellers. The posted CPO contains a set of conditions satisfying the variable conditions specified by the buyer in the variable CPO.

It is noted that each buyer may employ a general-purpose computer, such as the buyer interface 400, discussed below in conjunction with FIG. 4, for communicating with the CPO buyer agency system 100. The general-purpose computer of each buyer preferably comprises a processing unit, a modem, memory means and software required to communicate with the CPO buyer agency system 100.

The CPO buyer agency system 100 may periodically execute a CPO rule application process 1000, discussed below in conjunction with FIG. 10, and a CPO evaluation process 1100, discussed below in conjunction with FIGS. 11A and 11B, to monitor variable CPOs and to modify the terms of the posted CPO, within the tolerances specified by the buyer in the variable CPO, if the posted CPO has not been accepted within a predefined period of time, or has been expressly rejected by all potential sellers. Generally, the CPO rule application process 1000 monitors and modifies variable CPOs having Variable Condition Sets and the CPO evaluation process 1100 monitors and modifies variable CPOs having Predefined CPO Condition Sets.

The CPO buyer agency system 100 and buyer and seller interfaces 400–401 and 405–406 (collectively, the "nodes") transmit digitally-encoded data and other information between one another. The communication links between the nodes may comprise one or more cables, optical fibers or wireless links on which signals can propagate. For example, each node may be connected via an Internet connection using a public switched telephone network (PSTN), such as those provided by a local or regional telephone operating company. Alternatively, each node may be connected by dedicated data lines, cellular, Personal Communication Systems ("PCS"), microwave, or satellite networks.

Figure 2:
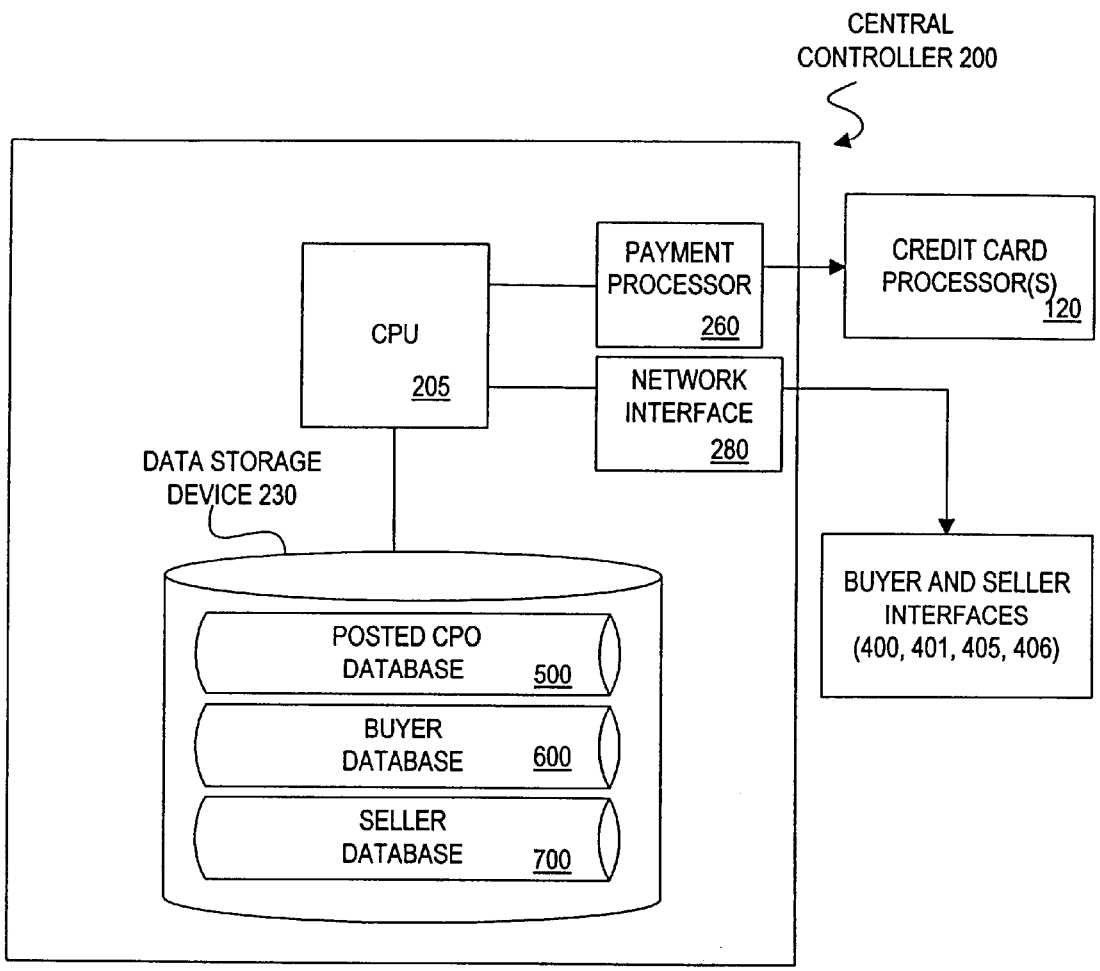
FIG. 2 is a schematic block diagram of the exemplary central controller of FIG. 1.

FIG. 2 is a block diagram showing the architecture of an illustrative central controller 200. The central controller 200 preferably includes certain standard hardware components, such as a central processing unit (CPU) 205, a data storage device 230, a payment processor 260 and a network interface 280. The CPU 205 is linked to each of the other listed elements, by means of a shared data bus, or dedicated connections, as shown in FIG. 2.

The CPU 205 may be embodied as a single commercially available processor, such as Intel's 300 MHz Pentium II microprocessor or Motorola's 266 MHz PowerPC 750 microprocessor. Alternatively, the CPU 205 may be embodied as a number of such processors operating in parallel.

The data storage device 230, as well as a read only memory (ROM) (not shown) are operable to store one or more instructions, which the CPU 205 is operable to retrieve, interpret and execute. For example, the data storage device 230, in cooperation with the payment processor 260, may store processes to accomplish the authentication and/or transfer of required payments, charges and debits, between the buyers and sellers. In particular, the payment processor 260 transmits the credit card information associated with a given buyer to the credit card processor(s) 120 (FIG. 1), such as First USA, for payment, by means of the transaction authorization network, if a CPO is accepted by a seller. The processing of such accounting transactions may be secured in a conventional manner, for example, using well known cryptographic techniques. Alternatively, the central controller 200 may transmit a buyer payment identifier, such as a credit card number, to a seller who has accepted the buyer's CPO for payment processing.

As discussed further below in conjunction with exemplary data provided in FIGS. 5 through 7, respectively, the data storage device 230 includes a posted CPO database 500, a buyer database 600 and a seller database 700. The posted CPO database 500 stores conventional CPOs which have been submitted by buyers, as well as the current condition set for each variable CPO. The buyer database 600 stores information on each buyer in communication with the CPO buyer agency system 100, including biographical information and billing information, such as a credit card number. The seller database 700 stores information on each seller registered with the CPO buyer agency system 100 to sell products to CPO customers, including the name of the seller and an indication of CPOs which have been accepted by each seller. The network interface 280 connects the central controller 200 to individual buyers and sellers, for example, by means of an Internet connection using the public switched telephone network (PSTN). The network interface 280 preferably includes multiple communication channels for simultaneously establishing a plurality of connections.

In addition, the central controller 200 is capable of performing one or more processes for (i) receiving CPOs from buyers, as well as one or more buyer agency modules 300, (ii) providing each posted CPO to the appropriate broadcast-based sellers and evaluate each CPO against the appropriate rules of each agency-based seller, (iii) determining whether any seller accepts a posted CPO and (iv) processing payments for accepted CPOs. Each received CPO includes an identifier of a general purpose account, such as a credit or debit card account from which funds may be paid. In this manner, the CPO is guaranteed with the general purpose account. Appropriate legal language is preferably displayed or read to the buyer at the time the CPO is received, to form a binding CPO. For a more detailed discussion of the processes performed by the central controller 200, see, for example, U.S. patent application Ser. No. 08/943,266, filed Oct. 3, 1997, a parent application to the present application, incorporated by reference herein.

Figure 3:
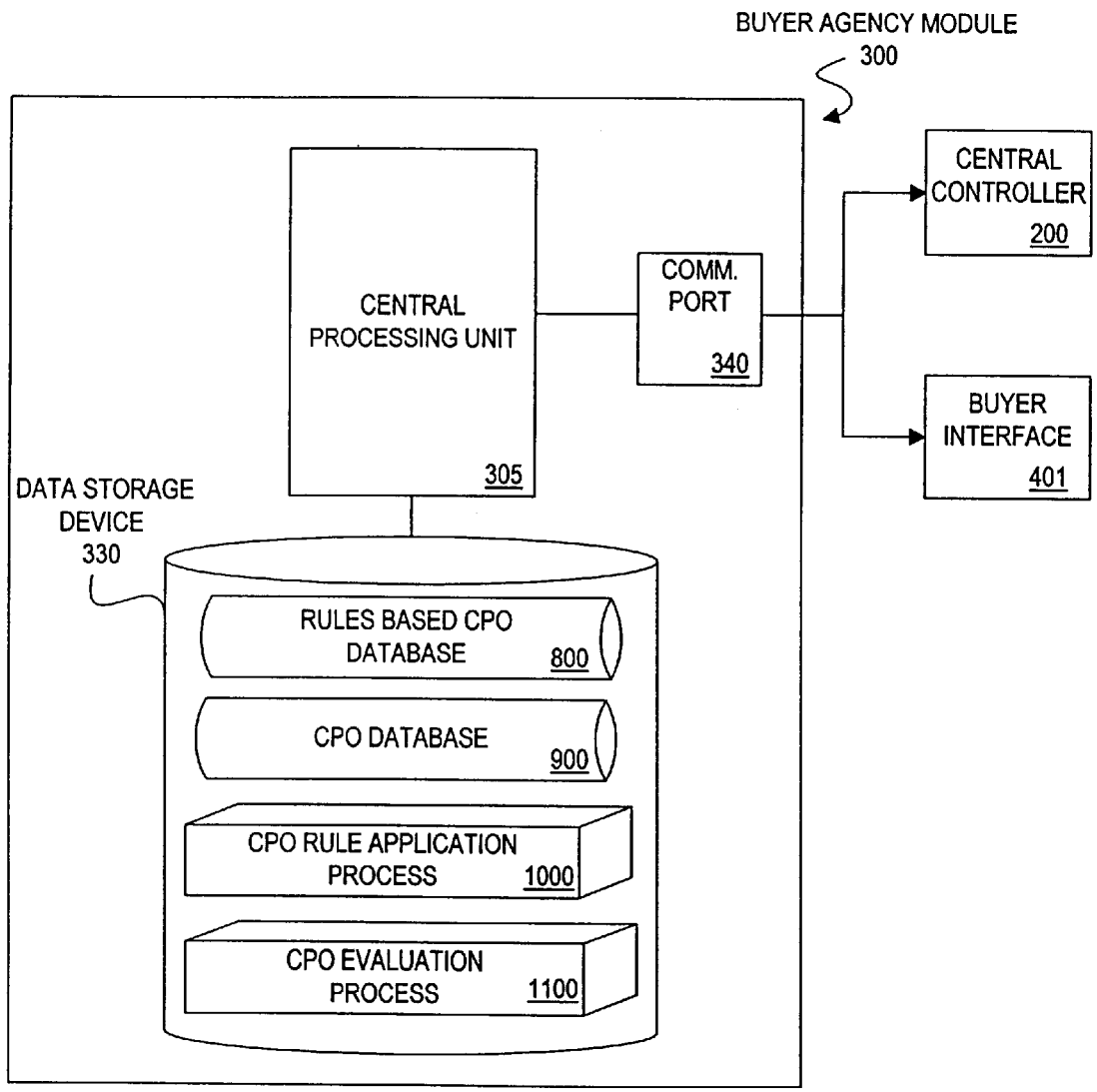
FIG. 3 is a schematic block diagram of the exemplary buyer agency module of FIG. 1.

FIG. 3 is a block diagram showing the architecture of an illustrative buyer agency module 300. As previously indicated, the CPO buyer agency system 100 may include one or more buyer agency modules 300 for processing received variable CPOs and for providing a CPO to the central controller 200 for posting to the sellers. Each posted CPO contains a set of conditions satisfying the variable conditions specified by the buyer in the variable CPO. Although the buyer agency module 300 is illustrated in FIG. 1 as being remote from the central controller 200, the features and functions of the buyer agency module 300 could easily be performed by the above-described hardware components of the central controller 200, as would be apparent to a person of ordinary skill. When the buyer agency module 300 is remote from the central controller 200, buyers are more likely to be confident that sellers will not have access to their spending limits or purchasing flexibilities. Each buyer agency module 300 can include certain standard hardware components, such as a central processing unit (CPU) 305, a data storage device 330, and a communications port 340. Each of these components may function identically to those corresponding components described above in conjunction with FIG. 2.

As discussed further below in conjunction with exemplary data provided in FIGS. 8 and 9, respectively, the data storage device 330 includes a rules-based CPO database 800 and a CPO database 900. The rules-based CPO database 800 stores variable CPOs having Variable Condition Sets, while the CPO database 900 stores CPOs having Predefined CPO Condition Sets. In addition, the data storage device 330 includes a CPO rule application process 1000 and a CPO evaluation process 1100 to monitor variable CPOs and to modify the terms of the posted CPO, within the tolerances specified by the buyer in the variable CPO, if the posted CPO has not been accepted by at least one seller within a predefined period of time, or has been expressly rejected by all potential sellers. Generally, the CPO rule application process 1000 monitors and modifies variable CPOs having Variable Condition Sets and the CPO evaluation process 1100 monitors and modifies variables CPOs having Predefined CPO Condition Sets.

The communications port 340 connects the buyer agency module 300 to the central controller 200, as well as to the buyer interfaces 400–401 of the buyers submitting variable CPOs. The communications port 340 preferably include multiple communication channels for simultaneously establishing a plurality of connections.

Figure 4:
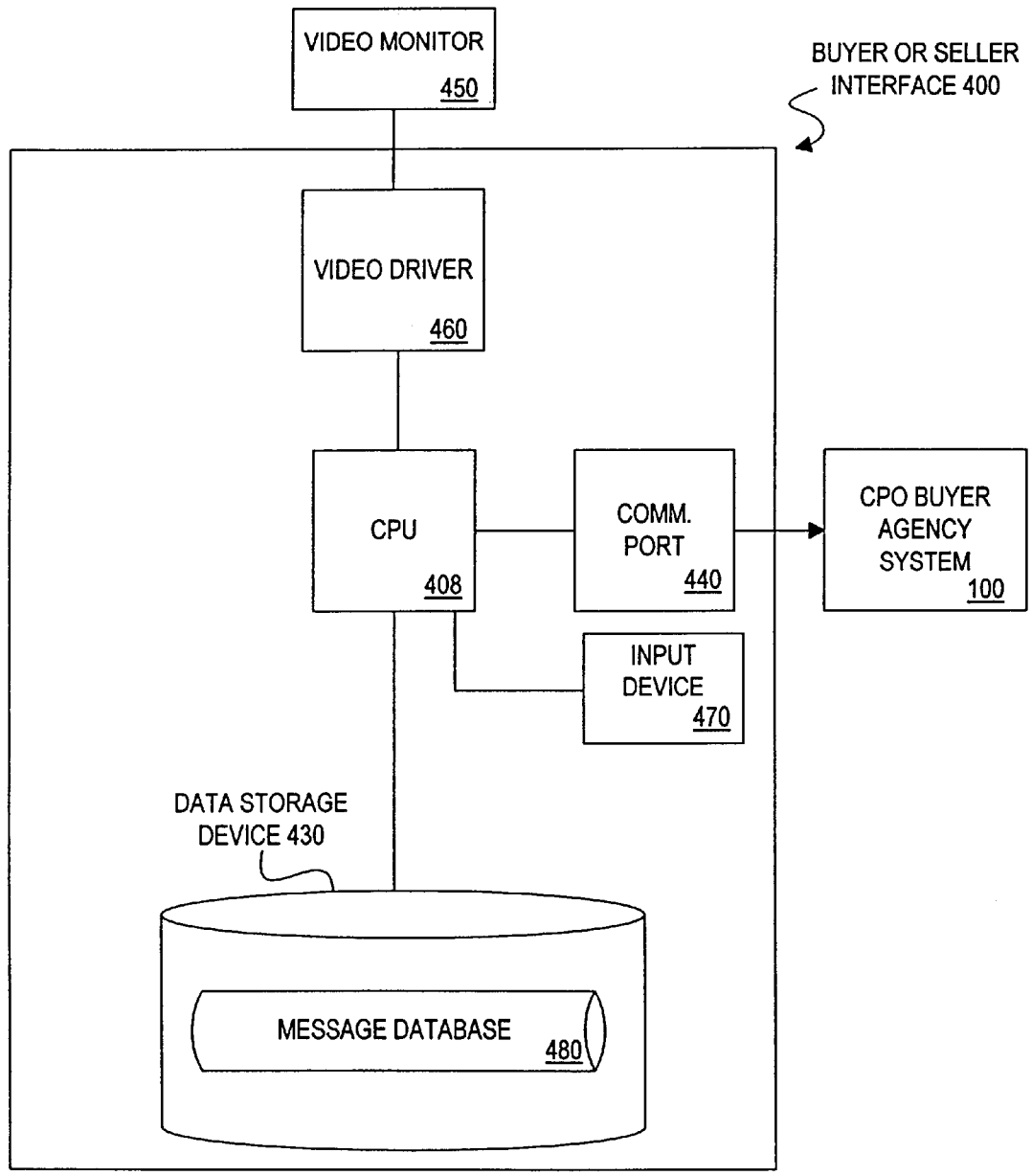
FIG. 4 is a schematic block diagram of the exemplary buyer or seller interface of FIG. 1.

FIG. 4 is a block diagram showing the architecture of buyer interface 400. The architecture illustrated in FIG. 4 is equally descriptive of the functionality of the buyer interface 401 and seller interfaces 405–406. The interface 400 preferably includes certain standard hardware components, such as a central processing unit (CPU) 408, a data storage device 430, and a communications port 440. Each of these components may function identically to those corresponding components described above in conjunction with FIG. 2. In addition, the interface 400 preferably includes a video monitor 450 for presenting video information to a user and a related video driver 460 for processing such video information, and an input device 470, such as a keyboard or mouse.

The data storage device 430 preferably includes a message database 480 for storing messages required by the respective buyer or seller interface 400–401 and 405–406 to communicate with the central controller 200 of the CPO buyer agency system 100. The communications port 440 connects the interface 400 to the CPO buyer agency system 100.

DATABASES

Several of the databases 500 through 900, discussed below in conjunction with FIGS. 5 through 9, contain time-sensitive data. The exemplary data set forth in the posted CPO database 500, the rules-based CPO database 800 and the CPO database 900 correspond to an illustrative date and time of Sep. 15, at 12:00 AM, as recorded by the date/time stamps 502, 802 and 902, shown in FIGS. 5, 8A and 9, respectively. FIG. 5 illustrates the posted CPO database 500 that contains a record of each conventional CPO which has been submitted by a buyer, as well as the current condition set for each variable CPO, including the conditions of each CPO and the associated status. The posted CPO database 500 maintains a plurality of records, such as records 505–520, each corresponding to a different posted CPO. For each posted CPO identified by CPO number in field 540, the posted CPO database 500 includes the corresponding expiration date, status, subject, price and conditions, in fields 545 through 565, respectively. An identifier of the buyer associated with each CPO is set forth in field 570. As discussed further below, records 505 and 515 contain the current posted CPO for variable CPOs having Variable Condition Sets (less flexible/higher price start point and more flexible/lower price start point, respectively) and records 510 and 520 contain the current posted CPO for variable CPOs having Predefined CPO Condition Sets.

FIG. 6 illustrates the buyer database 600 that stores information on each buyer that has submitted a CPO to the CPO buyer agency system 100. The buyer database 600 maintains a plurality of records, such as records 605–620, each corresponding to a different buyer. For each buyer identifier in field 625, the buyer database 600 includes the corresponding buyer name and address in fields 630 and 635, respectively, and credit card account number in field 640. In addition, the buyer database 600 preferably includes an indication of the CPO(s) associated with the buyer in field 645. The buyer identifier stored in field 625 may be utilized, for example, to index a historical database (not shown) of previous purchases and CPOs associated with the buyer. Such a historical database may be maintained separately from the buyer database 600. Alternatively, the historical database may be dynamically determined by searching the buyer database 600.

FIG. 7 illustrates the seller database 700 that stores information on each seller which is registered with the CPO buyer agency system 100 to sell goods or services to CPO buyers. The seller database 700 maintains a plurality of records, such as records 705–730, each corresponding to a different seller. For each seller identifier listed in field 735, the seller database 700 includes the corresponding seller name in field 740, as well as a CPO tracking number in field 745 for each CPO which has been accepted by the seller.

FIGS. 8A and 8B, collectively, illustrate the rules-based CPO database 800 that stores variable CPOs having Variable Condition Sets, including the first and second condition sets, as well as buyer rules to control the gradual posting of the condition sets between the first and second condition sets, as well as the appropriate adjustments to the corresponding offer price. The rules-based CPO database 800 maintains a plurality of records, such as records 805 and 810, each corresponding to a different variable CPO. For each buyer identifier listed in field 820, the rules-based CPO database 800 includes the subject of the variable CPO, as well as the corresponding date and time the CPO was submitted and its associated status in fields 825 through 835, respectively. In addition, the rules-based CPO database 800 stores the prices corresponding to the first and second condition sets in field 840 (as specified by the buyer), as well as the current posted price and price change amounts in fields 845 and 850, respectively. The price change amount may be obtained by dividing the difference between the first and second prices by the number of possible condition sets. For example, since the difference between the offer prices for the first and second condition sets is $40 for the variable CPO set forth in record 810, and the number of possible conditions sets is four (4) (first condition set, second condition set and two intermediate steps), the offer price is preferably increased by $10 for each change period.

The date and time of the last CPO price alteration, and the pending time required to alter the CPO price are recorded in fields 855 and 860, respectively. The pending time required to alter the CPO price may be obtained by dividing the difference the number of days between the offer date and the master expiration date for the variable CPO by the number of possible condition sets. For example, since the difference between the offer date and the master expiration date is twelve (12) days for the variable CPO set forth in record 810, and the number of possible conditions sets is four (4) (first condition set, second condition set and two intermediate steps), then the pending time necessary to alter the CPO price is three days. The manner in which the price alteration variables stored in fields 855 and 860 are processed by the CPO buyer agency system 100 is discussed below in conjunction with FIG. 10.

As shown in FIG. 8B, the rules-based CPO database 800 preferably stores the first and second condition sets in fields 865 and 870, respectively, and the priority of each condition in field 875. An identifier of the last condition that was altered is set forth in field 880. The date and time of the last CPO condition alteration, and the pending time required to alter the CPO conditions are recorded in fields 885 and 890, respectively. The pending time required to alter the CPO conditions may be obtained by dividing the number of days between the offer date and the master expiration date for the variable CPO, by the number of possible condition sets. Generally, the pending time required to alter the CPO conditions will be the same as the pending time required to alter the CPO price, unless the buyer specifies an alternative price/condition variation schedule. The manner in which the condition alteration variables stored in fields 885 and 890 are processed by the CPO buyer agency system 100 is discussed below in conjunction with FIG. 10. Although the information stored in fields 855, 860, 885 and 890 of the rules-based CPO database 800 permits separate times for changing the price and conditions of a CPO (by storing different values in fields 860 and 890), the implementation could be simplified by requiring that the price and conditions be adjusted at the same time. Finally, the rules-based CPO database 800 includes the expiration date and time of the current posted CPO, as well as the master expiration date for the entire variable CPO in fields 895 and 898, respectively.

FIG. 9 illustrates the CPO database 900 that stores variable CPOs having Predefined CPO Condition Sets, including each of the conditions and corresponding price for each CPO. The CPO database 900 maintains a plurality of records, such as records 905 and 910, each corresponding to a different variable CPO. For each buyer identifier listed in field 920, the CPO database 900 includes a corresponding CPO identifier, offer date and subject in fields 925 through 935, respectively. In addition, the CPO database 900 includes the price and corresponding conditions for each condition set in the CPO in fields 940 and 945, respectively. The priority and status of each condition and price set pair is recorded in fields 950 and 955, respectively, and the identification number of the condition/price set pair which is currently posted is set forth in field 960. The pending time necessary to post a new condition/price set pair, the expiration date and time of the current posted condition/price set pair, and the master expiration date of the overall variable CPO are set forth in fields 965 through 975, respectively. The manner in which the posting variable stored in field 965 is processed by the CPO buyer agency system 100 is discussed below in conjunction with FIGS. 11A and 11B. The pending time value stored in field 965 is calculated by dividing the number of days between the offer date (field 930) and the master expiration date (field 975) for the variable CPO, by the number of predefined condition sets (number of individual CPOs within the variable CPO).

PROCESSES

As discussed above, the buyer agency module 300 may periodically execute a CPO rule application process 1000, described by the flowchart in FIGS. 10A through 10F, to monitor variable CPOs having Variable Condition Sets and to modify the terms of the posted CPO, in accordance with the buyer-specified rules that control the gradual posting of the condition sets between the first and second condition sets, as well as the appropriate adjustments to the corresponding offer price, if the posted CPO remains unaccepted after a predefined period of time. The CPO rule application process 1000 is preferably initiated upon expiration of the current posted offer, as recorded in field 895 of the rules-based CPO database 800. Although the CPO rule application process 1000 permits separate times for changing the CPO conditions and price, the CPO rule application process 1000 could be simplified by requiring that the price and conditions be adjusted at the same time, as would be apparent to a person of ordinary skill.

Figure 10A:
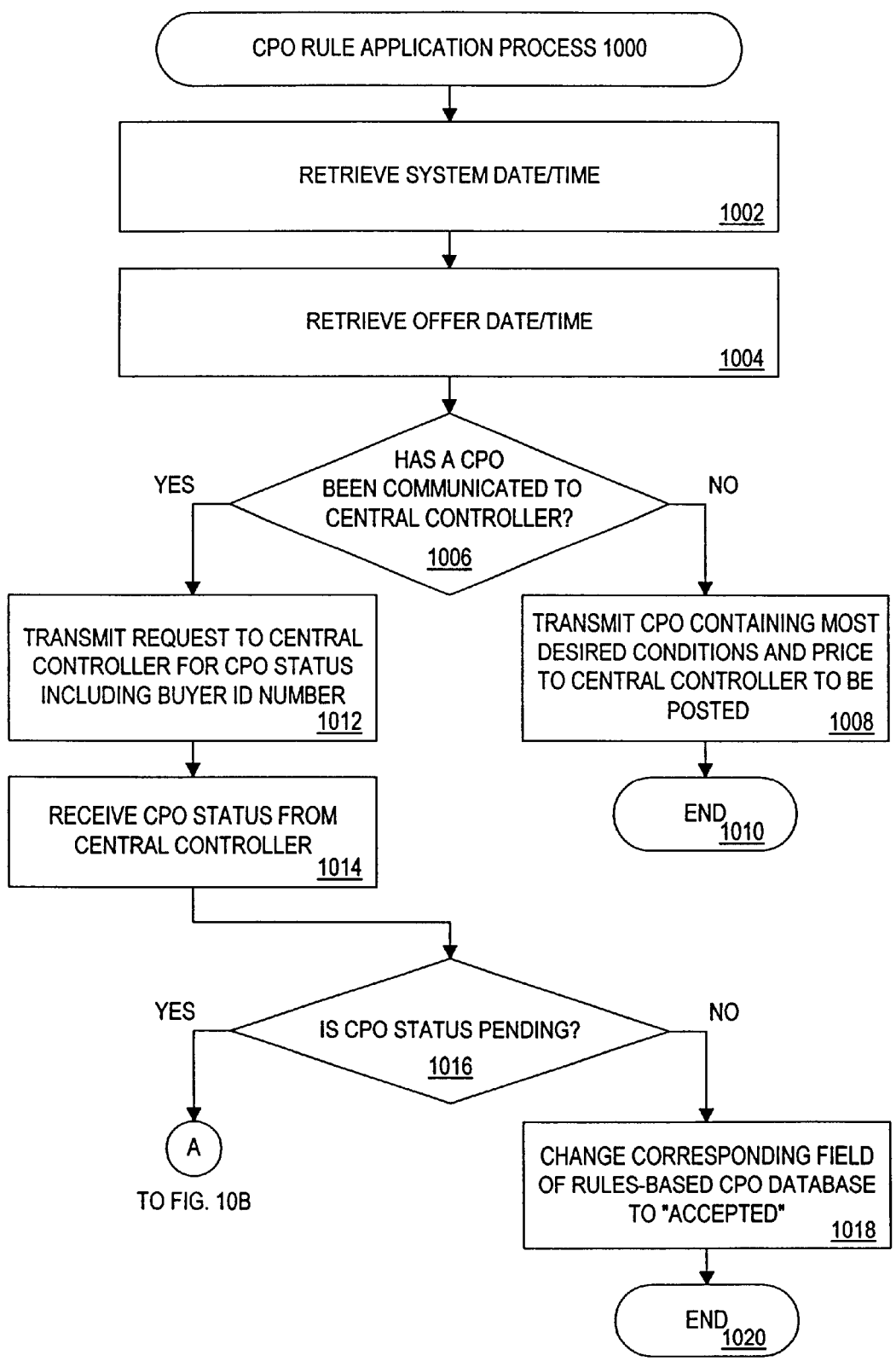
FIGS. 10A through 10F, collectively, are a flow chart describing an exemplary CPO rule application process implemented by the buyer agency module of FIG. 3.

As illustrated in FIG. 10A, the CPO rule application process 1000 initially retrieves the system date/time during step 1002, for example, from the clock 325 (FIG. 3) and the offer date/time of the CPO from field 830 of the rules-based CPO database 800 during step 1004. Thereafter, a test is performed during step 1006 to determine if a CPO associated with the current variable CPO has been communicated to the central controller 200. If it is determined during step 1006 that a CPO associated with the current variable CPO has not been communicated to the central controller 200, then a CPO is transmitted to the central controller 200 during step 1008 containing the first condition set and price. The first condition set and prices are retrieved from fields 840 and 865 of the rules-based CPO database 800 (FIGS. 8A and 8B). Thereafter, program control terminates during step 1010.

If, however, it is determined during step 1006 that a CPO associated with the current variable CPO has already been communicated to the central controller 200, then the CPO rule application process 1000 must determine if sufficient time has elapsed to modify the terms of the variable CPO in accordance with the rules specified by the buyer. Thus, the CPO rule application process 1000 transmits a request, including the buyer identifier, for the status of the currently posted CPO to the central controller 200 during step 1012. Once the CPO status is received from the central controller 200 during step 1014, a test is performed during step 1016 to determine if the status of the currently posted CPO is still "pending." If it is determined during step 1016 that the status of the currently posted CPO is no longer "pending," then the corresponding status field 835 in the rules-based CPO database 800 is changed to indicate that the CPO has been "accepted" during step 1018, before program control terminates during step 1020.

Figure 10B:
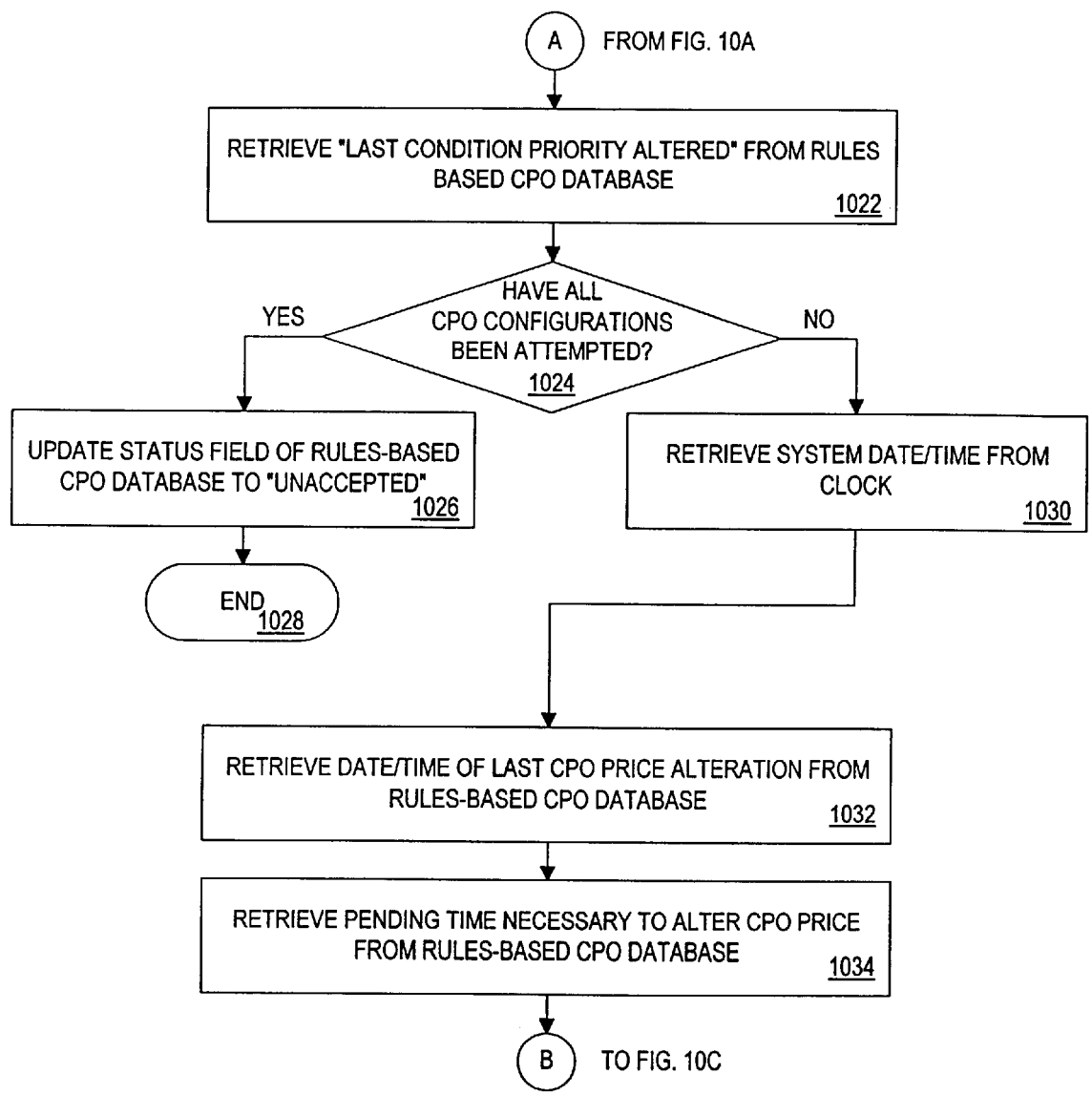
Figure 10C:
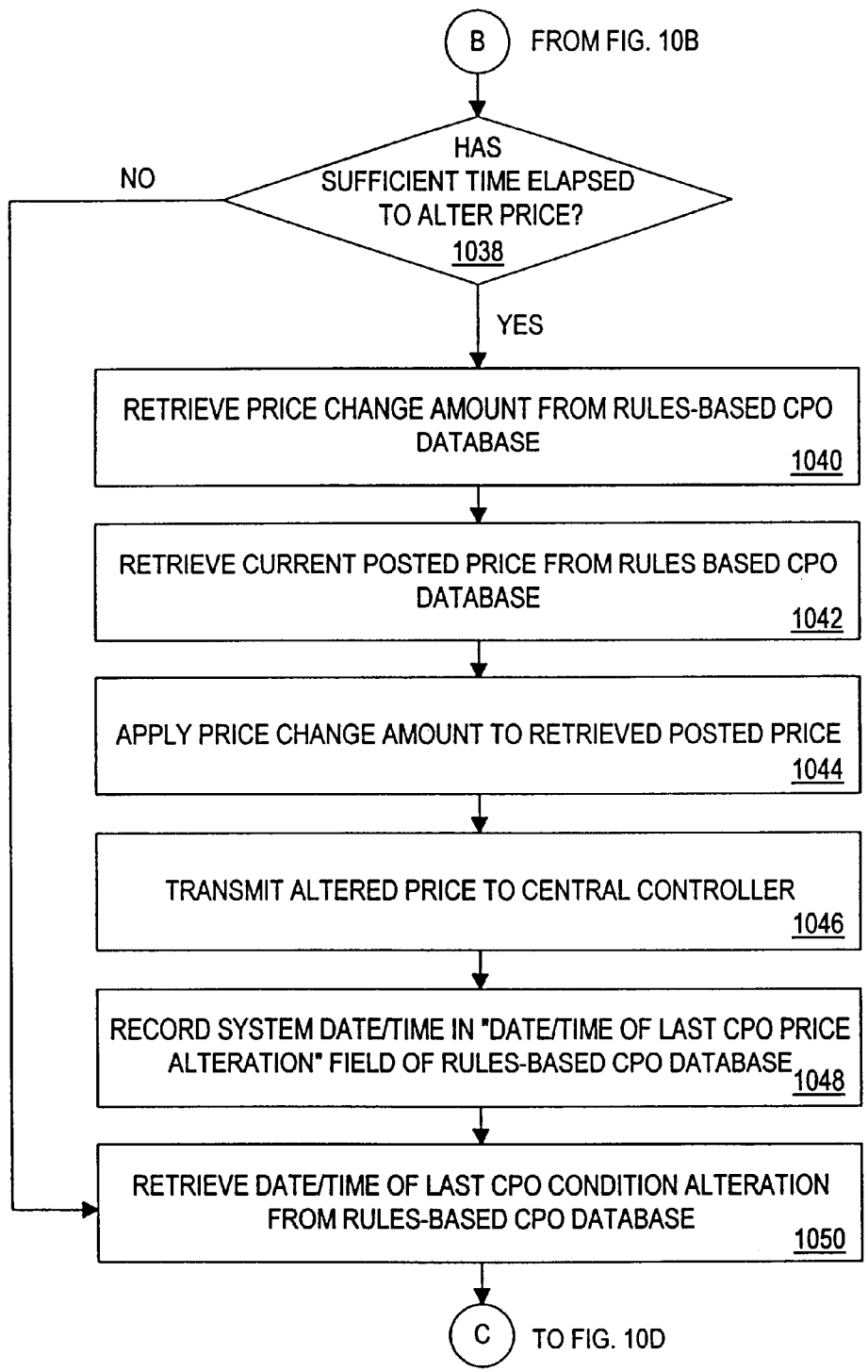

If, however, it is determined during step 1016 that the status of the currently posted CPO is still "pending," then the "last condition priority altered" is retrieved from field 880 of the rules-based CPO database 800 during step 1022 (FIG. 10B). A test is then performed during step 1024 to determine if all of the possible CPO configurations have been attempted. In other words, have all the conditions within the initial first condition set been altered to the second condition value. If it is determined during step 1024 that all of the possible CPO configurations have been attempted, then the status field 835 of the rules-based CPO database 800 is updated during step 1026 to indicate that the variable CPO was "unaccepted," before program control terminates during step 1028.

If, however, it is determined during step 1024 that all of the possible CPO configurations have not been attempted, then the CPO rule application process 1000 will proceed to determine and transmit the next condition set to the central controller 200. Thus, the current system date/time is retrieved from the clock 325 (FIG. 3) during step 1030. The date and time of the last CPO price alteration is then retrieved from field 855 of the rules-based CPO database 800 (FIG. 8A) during step 1032. The pending time necessary to alter the CPO price is then retrieved from field 860 of the rules-based CPO database 800 (FIG. 8A) during step 1034.

A test is then performed during step 1038 (FIG. 10C) to determine if sufficient time has elapsed to alter the posted price. If it is determined during step 1038 that sufficient time has not elapsed to alter the price, then program control proceeds to step 1050, discussed below. If, however, it is determined during step 1038 that sufficient time has elapsed to alter the price, then the amount of the price adjustment is calculated and provided to the central controller 200 during steps 1040 through 1048. Specifically, the amount of the price change and the current posted price are retrieved from fields 850 and 845, respectively, of the rules-based CPO database 800 during steps 1040 and 1042, respectively. The price change amount is then applied to the current posted price during step 1044, and the new price is transmitted to the central controller 200 during step 1046. The current system date/time is recorded in field 855 of the rules-based CPO database 800 during step 1048.

Figure 10D:
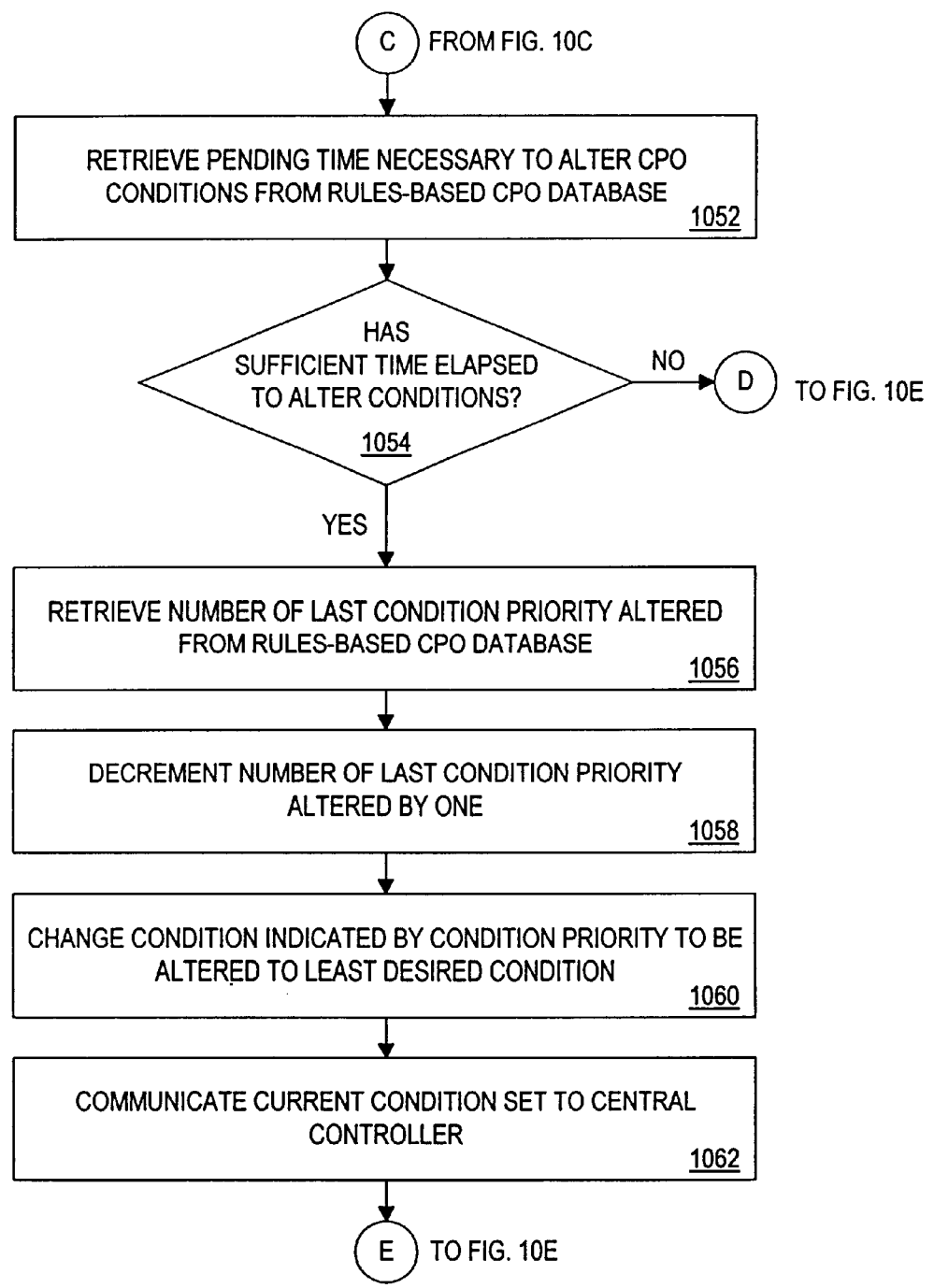
Figure 10E:
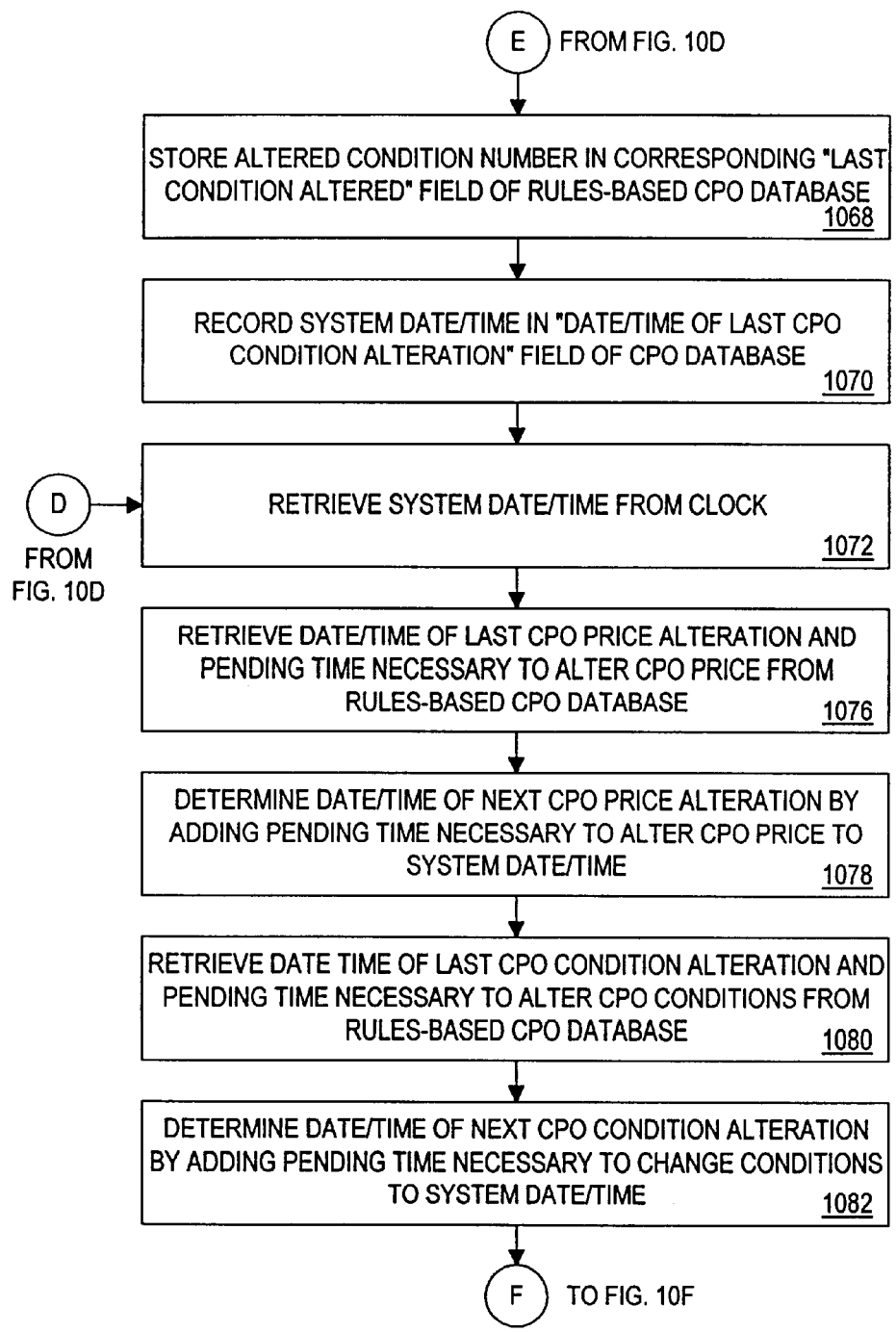
Figure 10F:
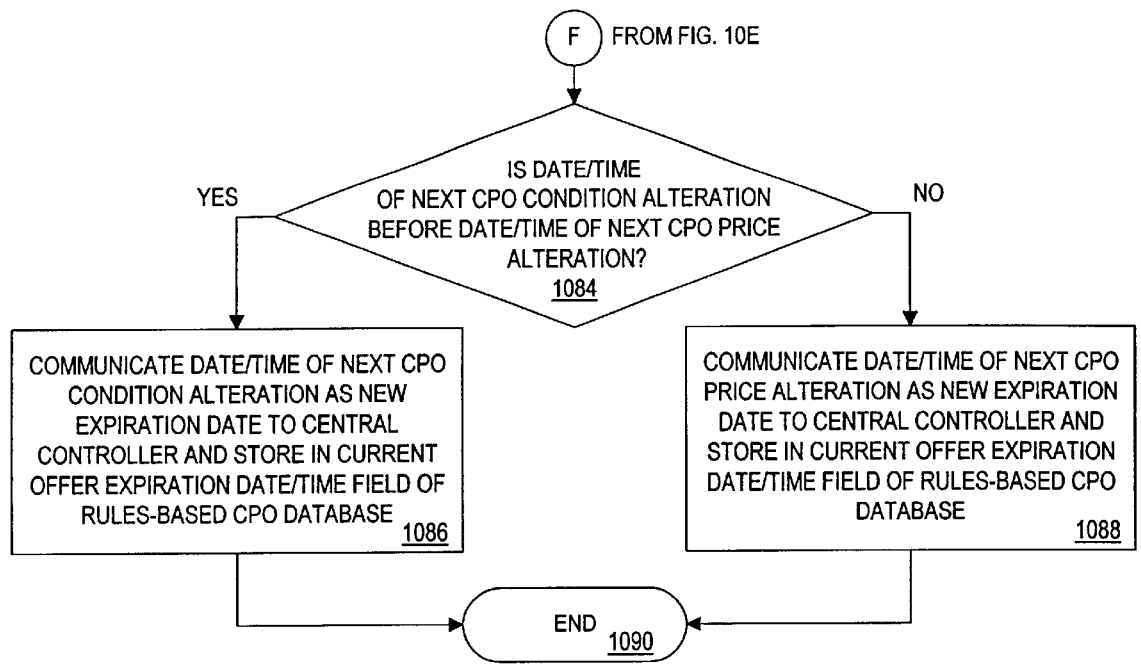

The date and time of the last CPO condition alteration is then retrieved from field 885 of the rules-based CPO database 800 (FIG. 8B) during step 1050. The pending time necessary to alter the CPO conditions is then retrieved from field 890 of the rules-based CPO database 800 (FIG. 8B) during step 1052 (FIG. 10D). A test is then performed during step 1054 to determine if sufficient time has elapsed to alter the posted conditions. If it is determined during step 1054 that sufficient time has not elapsed to alter the conditions, then program control proceeds to step 1072 (FIG. 10E), discussed below.

If, however, it is determined during step 1054 that sufficient time has elapsed to alter the conditions, then the appropriate next condition set is determined and provided to the central controller 200 during steps 1056 through 1070. In one embodiment, the lowest priority conditions (as specified by the buyer) are altered first. Thus, an identifier of the last condition priority altered is retrieved from field 880 of the rules-based CPO database 800 during step 1056 and is then decremented by one during step 1058 (to reflect that conditions should be altered from lowest priority conditions to highest priority conditions). The value of the condition indicated by the next condition priority to be altered is then changed to the second condition value during step 1060. The current condition set is then communicated to the central controller 200 during step 1062. The altered condition number is then stored in field 880 of the rules-based CPO database 800 during step 1068 (FIG. 10E) and the system date and time is recorded in field 885 of the rules-based CPO database 800 during step 1070.

Finally, the CPO rule application process 1000 will determine the expiration date that applies to the currently posted CPO during steps 1072 through 1088. Specifically, the CPO rule application process 1000 will retrieve the current system date and time from the clock 325 during step 1072. The date and time of the last CPO price alteration, and the pending time necessary to alter the CPO price are retrieved from fields 855 and 860, respectively, of the rules-based CPO database 800 during step 1076. The date and time of the next CPO price alteration are then calculated during step 1078 by adding the pending time retrieved during the previous step 1076 to the current system date and time, retrieved during step 1072. The date and time of the last CPO condition alteration, and the pending time necessary to alter the CPO condition are retrieved from fields 885 and 890, respectively, of the rules-based CPO database 800 during step 1080. The date and time of the next CPO condition alteration are then calculated during step 1082 by adding the pending time retrieved during the previous step 1080 to the current system date and time, retrieved during step 1072.

A test is then performed during step 1084 (FIG. 10F) to determine if the date and time of the next CPO condition alteration is before the date and time of the next CPO price alteration. If it is determined during step 1084 that the date and time of the next CPO condition alteration is before the date and time of the next CPO price alteration, then the date and time of the next CPO condition alteration are transmitted to the central controller 200 as the new expiration date for the currently posted CPO and stored in field 895 of the rules-based CPO database 800 as the expiration date of the currently posted CPO during step 1086.

If, however, it is determined during step 1084 that the date and time of the next CPO condition alteration is after (or equal to) the date and time of the next CPO price alteration, then the date and time of the next CPO price alteration is transmitted to the central controller 200 as the new expiration date for the currently posted CPO and stored in field 895 of the rules-based CPO database 800 as the expiration date of the currently posted CPO during step 1088. Program control then terminates during step 1090.

Figure 11A:
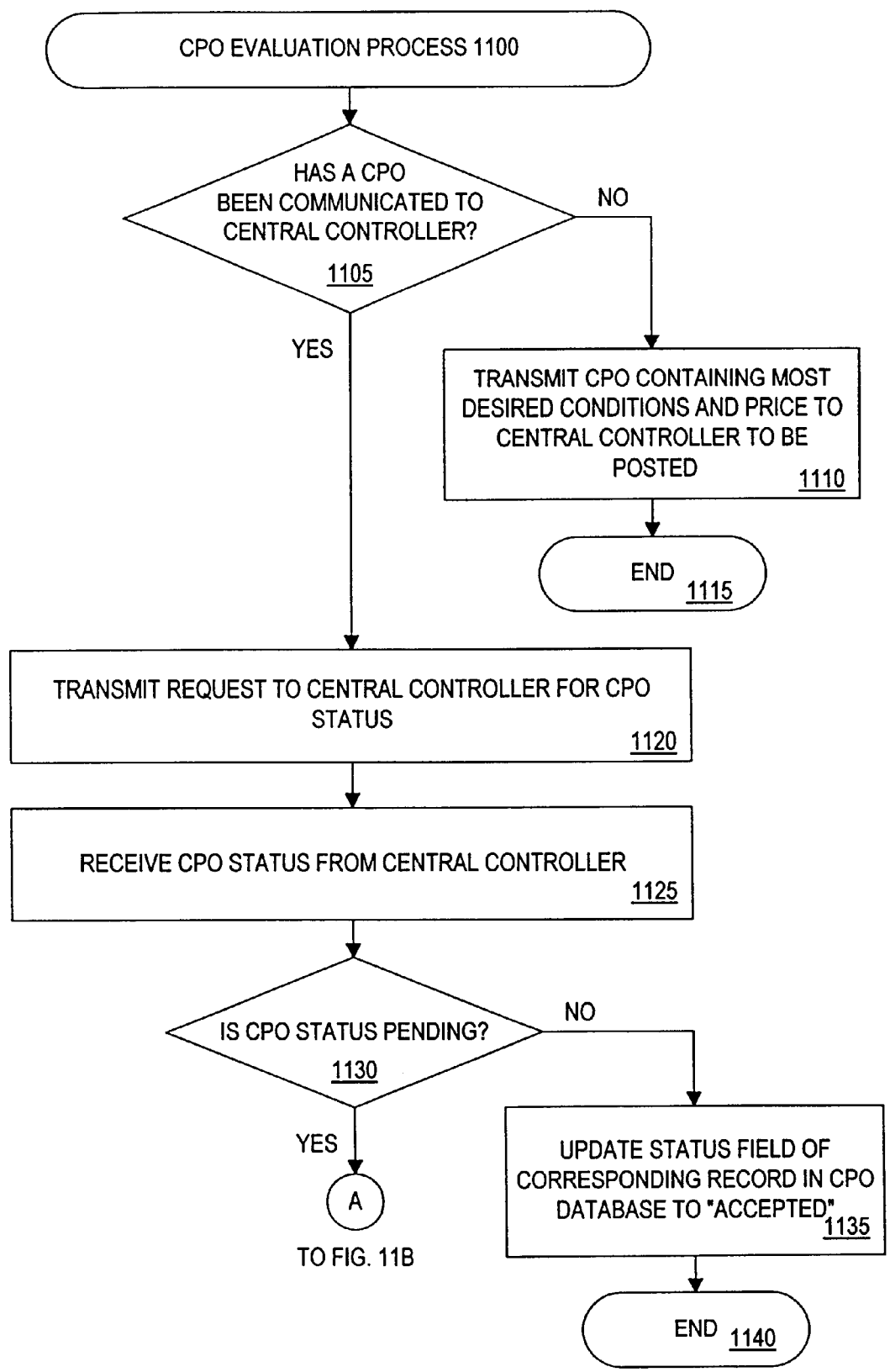
FIGS. 11A and 11B, collectively, are a flow chart describing an exemplary CPO evaluation process implemented by the buyer agency module of FIG. 3.
Figure 11B:
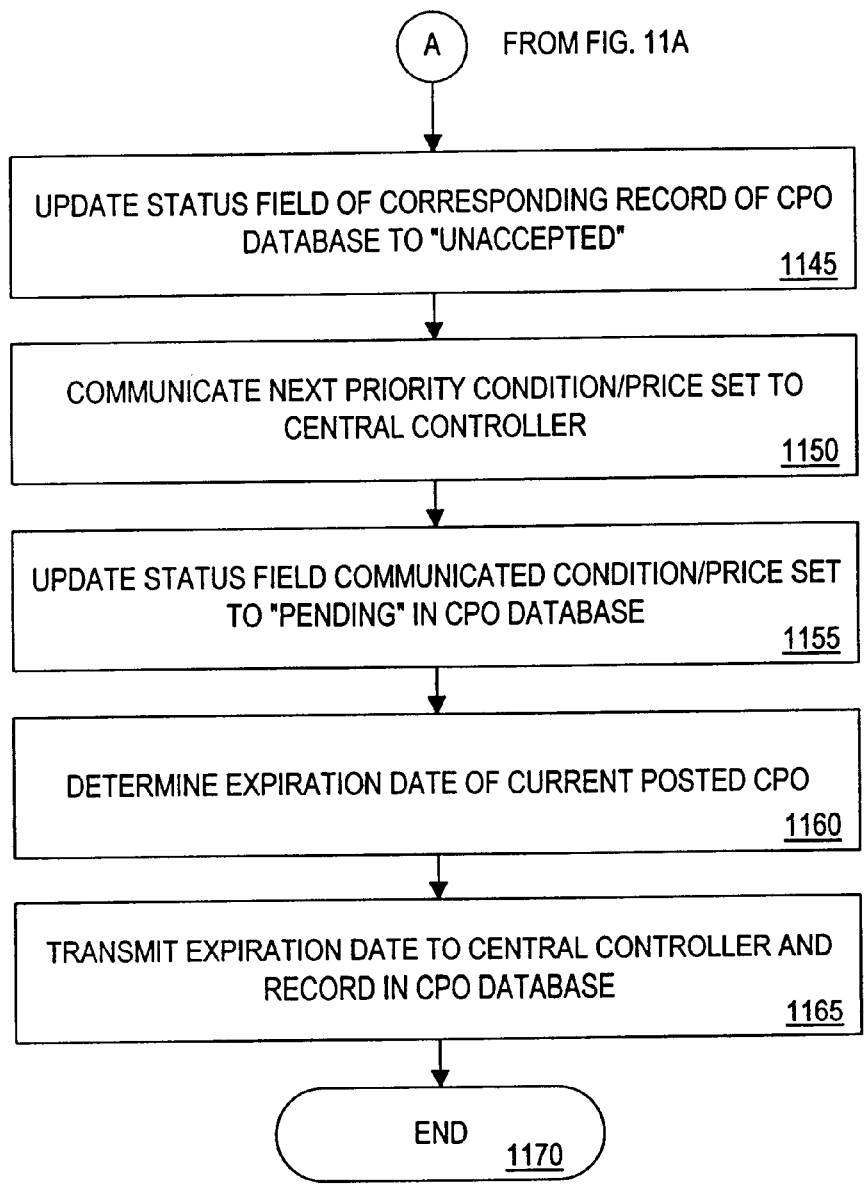

As discussed above, the buyer agency module 300 preferably periodically executes a CPO evaluation process 1100, shown in FIGS. 11A and 11B, to monitor variable CPOs having Predefined CPO Condition Sets and to modify the terms of a posted CPO, within the tolerances permitted by the variable CPO, if the posted CPO remains unaccepted after a predefined period of time. As illustrated in FIG. 11A, the CPO evaluation process 1100 initially performs a test during step 1105 to determine if a CPO associated with the current variable CPO has been communicated to the central controller 200. If it is determined during step 1105 that a CPO associated with the current variable CPO has not been communicated to the central controller 200, then the highest priority CPO is transmitted to the central controller 200 during step 1110, as retrieved from fields 940, 945 and 950 of the CPO database 900 (FIG. 9), before program control terminates during step 1115.

If, however, it is determined during step 1105 that a CPO associated with the current variable CPO has already been communicated to the central controller 200, then the CPO evaluation process 1100 must determine if sufficient time has elapsed to post the next preferred CPO. Thus, the CPO evaluation process 1100 transmits a request, including the buyer identifier, to the central controller 200 during step 1120 for the status of the currently posted CPO. Once the CPO status is received from the central controller 200 during step 1125, a test is performed during step 1130 to determine if the status of the currently posted CPO is still "pending." If it is determined during step 1130 that the status of the currently posted CPO is no longer "pending," then the corresponding status field 955 in the CPO database 900 is changed to indicate that the CPO has been "accepted" during step 1135, before program control terminates during step 1140.

If, however, it is determined during step 1130 that the status of the currently posted CPO is still "pending," then the status of the corresponding record of the CPO database 900 is changed to "unaccepted" during step 1145 (FIG. 11B), and the next priority condition/price set pair is transmitted to the central controller 200 during step 1150. The status of the record of the CPO database 900 corresponding to the condition/price set pair is changed to "pending" during step 1155. The expiration date corresponding to the currently posted CPO is calculated during step 1160 by adding the pending time necessary to post a new condition/price set pair (from field 965) to the previous expiration date recorded in field 970. Finally, the new expiration date for the currently posted CPO is transmitted to the central controller 200 and recorded in field 965 of the CPO database 900 during step 1165, before program control terminates during step 1170.

It is to be understood that the embodiments and variations shown and described herein are merely illustrative of the principles of this invention and that various modifications may be implemented by those skilled in the art without departing from the scope and spirit of the invention.

For example, as previously indicated, although the present invention has been illustrated in a travel environment, the CPO buyer agency system 100 could be utilized to sell any item, as would be apparent to a person of ordinary skill.

We claim:

1. A method for using a computer to process the sale of goods or services, comprising:

receiving in said computer a plurality of purchase offers for goods or services from a buyer, each of said purchase offers containing at least one condition and a buyer-specified price;

receiving a payment identifier specifying a general purpose account from which funds may be paid at said buyer-specified price; and thereafter providing at least one of said plurality of purchase offers to a plurality of sellers;

obtaining at least one acceptance of said at least one provided purchase offer;

determining a first acceptance obtained, thereby determining a first seller of the plurality of sellers; and processing the sale of said goods or services between said buyer and said first seller which has accepted a purchase offer.

2. The method according to claim 1, wherein said providing comprises providing at least a first and a second of said plurality of purchase offers to a plurality of sellers in a sequential manner, and wherein said second purchase offer is not provided to said plurality of sellers until said first purchase offer was not accepted for a predetermined time period.

3. The method according to claim 1, wherein said providing comprises providing a first and a second of said plurality of purchase offers to a plurality of sellers simultaneously.

4. The method according to claim 3, wherein upon determining a first acceptance obtained of said first or second purchase offer, further comprising canceling said other of said first or second purchase offer.

5. The method according to claim 1, wherein upon said determining a first acceptance obtained, payment is provided to the first seller.

6. The method according to claim 1, wherein upon said determining a first acceptance obtained, payment is transferred from said buyer to the first seller.

7. The method of claim 1 further comprising:
prior to said providing, displaying appropriate legal language to said buyer to form a binding offer.

8. A method, comprising:
receiving in a computer system an indication of a first purchase offer and a second purchase offer from said buyer, the first purchase offer including:
a first condition value, and
a first price;
and the second purchase offer including:
a second condition value, and
a second price;
receiving a payment identifier specifying a general purpose account from which funds may be paid for said purchase offers;
after receiving said first purchase offer, said second purchase offer, and said payment identifier, providing the first purchase offer to a plurality of sellers;
determining if the first purchase offer was accepted within a predetermined time period;
if the first purchase offer was not accepted within said predetermined time period, providing the second purchase offer to a plurality of sellers; and
if said first or said second purchase offer is accepted by any seller, processing a sale in accordance with said acceptance.

9. The method according to claim 8, further comprising canceling said first purchase offer upon providing said second purchase offer.

10. The method according to claim 8, wherein said providing the second purchase offer comprises modifying the first purchase offer in accordance with the second condition value and the second price.

11. The method of claim 8 further comprising:
prior to said providing, displaying appropriate legal language to said buyer to form a binding offer.

12. A method for processing the purchase of an item using a computer system, comprising:
obtaining in said computer system a variable purchase offer from a customer for said item, said variable purchase offer containing a first condition set and a second condition set, and an offer price for each of said condition sets;
obtaining a payment identifier from said customer, said payment identifier specifying a financial account to provide payment for said variable purchase offer; and
after receiving said variable purchase offer and said payment identifier, providing a purchase offer to a plurality of sellers containing said first set of conditions;
determining whether any of said sellers accepts said purchase offer;
modifying at least one variable condition within said first condition set to a second condition value if said variable purchase offer is not accepted within a predefined time period;
providing said modified purchase offer to said plurality of sellers; and
if an acceptance is received for one of said purchase offers, processing the purchase of said item.

13. The method according to claim 12, wherein said modifying is repeated until all of said variable conditions within said first condition set have been modified to said second condition value.

14. The method according to claim 12, further comprising modifying said offer price for each modification to said variable conditions within said first condition set.

15. The method according to claim 12, further comprising initiating use of said payment identifier if said customer does not purchase said item after a seller accepts one of said purchase offers.

16. The method according to claim 12, wherein said variable conditions within said first condition set are modified in accordance with a condition priority established by the buyer.

17. The method according to claim 11, wherein said variable conditions within said condition set are modified until all configurations of said first and said second condition sets have been exhausted.

18. The method according to claim 11, wherein said variable conditions within said condition set are modified for each time period equal to the pendency period of said purchase offer divided by the number of possible modifications to said conditions.

19. The method according to claim 11, wherein said offer price is modified each time said conditions are modified.

20. The method according to claim 19, wherein said price modification is equal to the difference between said first and second prices divided by the number of possible modifications to said conditions.

21. The method according to claim 11, wherein said purchase offer is modified if said purchase offer is rejected by all sellers.

22. The method according to claim 11, wherein said purchase offer further includes a set of rules to control the gradual posting of the condition sets between the first and second condition sets.

23. The method according to claim 11, further comprising the step of binding said customer to purchase said item if an acceptance is received for one of said purchase offers.

24. The method according to claim 11, wherein said first condition set is associated with an ideal condition set and a corresponding maximum price.

25. The method according to claim 11, wherein said first condition set is associated with a broad or flexible set of conditions and a corresponding minimum offer price.

26. The method of claim 12 further comprising:
prior to said providing, displaying appropriate legal language to said buyer to form a binding variable purchase offer.

27. A method of using a computer system to process the sale of goods or services, comprising:
receiving by said computer system a plurality of purchase offers from a customer for said goods or services, said purchase offers containing a plurality of condition sets and buyer-defined offer prices;
receiving a payment identifier specifying a financial account to provide payment for said buyer-defined offer prices upon acceptance of any of said purchase offers; and thereafter
evaluating by said computer system a first purchase offer against seller inventory and pricing information of a plurality of sellers to determine whether said first purchase offer is to be accepted by said computer system on behalf of any seller;
if said first purchase offer is not accepted by said computer system on behalf of any seller, evaluating a second purchase offer against said seller inventory and pricing information of the plurality of sellers to determine whether said second purchase offer is to be accepted by said computer system on behalf of any seller; and processing the sale of said goods or services if one of the purchase offers is accepted.

28. A system for processing the sale of goods or services, comprising:

a memory device;

a processor disposed in communication with said memory device, said processor configured to:
  receive a plurality of purchase offers for goods or services from a buyer, each of said purchase offers containing at least one condition and a buyer-specified price;
  receive a payment identifier specifying a general purpose account from which funds may be paid for any of said purchase offers; and thereafter
    provide at least one of said plurality of purchase offers to a plurality of sellers;
    obtain at least one acceptance of said at least one provided purchase offer;
    determine a first acceptance obtained, thereby determining a first seller of the plurality of sellers; and
    process the sale of said goods or services between said buyer and said first seller.

29. The system according to claim 28, wherein said processor is further configured to provide at least a first and a second of said plurality of purchase offers to a plurality of sellers in a sequential manner, and wherein said second purchase offer is not provided to said plurality of sellers until said first purchase offer was not accepted for a predetermined time period.

30. The system according to claim 28, wherein said processor is further configured to provide a first and a second of said plurality of purchase offers to a plurality of sellers simultaneously.

31. A system, comprising:

a memory device;

a processor disposed in communication with said memory device, said processor configured to:
  receive an indication of a first purchase offer and a second purchase offer from a buyer, the first purchase offer including:
    a first condition value, and
    a first price;
  and the second purchase offer including:
    a second condition value, and
    a second price;
  receive a payment identifier specifying a general purpose account from which funds may be paid for said purchase offers;
  after receiving said first purchase offer, said second purchase offer, and said payment identifier, provide the first purchase offer to a plurality of sellers;
  determine if the first purchase offer was accepted within a predetermined time period;
  if the first purchase offer was not accepted within said predetermined time period, provide the second purchase offer to a plurality of sellers; and
  if said first or said second purchase offer is accepted by any seller, process a sale in accordance with said acceptance.

32. A system for processing the purchase of an item, comprising:

a memory;

a processor disposed in communication with said memory, said processor configured to:
  obtain a variable purchase offer from a customer for said item, said variable purchase offer containing a first condition set and a second condition set, and an offer price for each of said condition sets;
  obtain a payment identifier from said customer, said payment identifier specifying a financial account to provide payment for said item; and
  after receiving said variable purchase offer and said payment identifier, provide a purchase offer to a plurality of sellers containing said first condition set;
  determine whether any of said sellers accepts said purchase offer;
  modify at least one variable condition within said first condition set to a second condition value if said variable purchase offer is not accepted within a predefined time period;
  provide said modified purchase offer to said plurality of sellers; and
  if an acceptance is received for said variable purchase offer or said modified purchase offer, process the purchase of said item.

33. A computer system for processing the sale of goods or services, comprising:

a memory;

a processor disposed in communication with said memory, said processor configured to:
  receive a plurality of purchase offers from a customer for said goods or services, said purchase offers containing a plurality of condition sets and buyer-defined offer prices;
  receive a payment identifier specifying a financial account to provide payment for said buyer-defined offer prices upon acceptance of any of said purchase offers; and thereafter
  evaluate a first purchase offer against seller inventory and pricing information of a plurality of sellers to determine whether said first purchase offer is to be accepted by said computer system on behalf of any seller;
  if said first purchase offer is not accepted by said computer system on behalf of any seller, evaluate a second purchase offer against said seller inventory and pricing information of the plurality of sellers to determine whether said second purchase offer is to be accepted by said computer system on behalf of any seller; and
  process the sale of said goods or services if any purchase offer is accepted.

* * * * *

UNITED STATES PATENT AND TRADEMARK OFFICE
CERTIFICATE OF CORRECTION

PATENT NO.    : 6,356,878 B1
DATED         : March 12, 2002
INVENTOR(S)   : Jay S. Walker et al.

It is certified that error appears in the above-identified patent and that said Letters Patent is hereby corrected as shown below:

<u>Title page,</u>
Item [56], References Cited, OTHER PUBLICATIONS, please add
-- The Loan Process, downloaded from www.sdtech.com/mls/process on August 7, 1997

Trade-Direct: We Help You Trade With Confidence, selected pages downloaded from www.trade-direct.com on August 6, 1997

Internet Mortgage Service Eliminates Loan agents and Passes Commissions on the Consumer, Company Press Release, Yahoo Business Wire (June 30, 1997)

Frequently Asked Questions About: Airhitch, selected pages downloaded from www.isicom.com.fr/airhitch on May 6, 1997

"Bookit airfare Bidding System (fax for Your Plane Ticket?)", Consumer Reports Travel Letter, September 1991, pages 97 & 106

"Upton , Kim "French Say Monoliths off-limits to Visitors", Los Angeles Times, August 25, 1991

"Carey, Christopher, "Firm Offers Auction For Airline Tickets", St. Louis Post-Dispatch, August 7, 1991 at page 1B."

NASDAQ Adds Enhancements to SOES Limit Order File", Securities Week, November 26, 1990, page 5

Ritter, Jeffrey B., "Scope of the Uniform Commercial Code: Computer Contracting Cases and Electrical Commercial Practices", 45 Bus. Law 2533, August, 1990

Greenburg, Peter, S., "Judging DeRegulation", The Record, July 22, 1990 at page T01

Greenburg, Peter, S., "The Savvy Traveler: Lower Air Fares For Consumers Not in the Cards; Airlines: Remember When It Cost $16 to Fly From Los Angeles to San Francisco? Then You Remember the Days Before DeRegulation. Since Then, Price Have Soared", Los Angels Times, July 8, 1990 at page L2.

Wallace, David, "Company Planning to Let Fliers Bid on Airfares", Philadelphia Business Journal, March 26, 1990 at page 15 --

UNITED STATES PATENT AND TRADEMARK OFFICE
CERTIFICATE OF CORRECTION

PATENT NO.    : 6,356,878 B1
DATED         : March 12, 2002
INVENTOR(S)   : Jay S. Walker et al.

It is certified that error appears in the above-identified patent and that said Letters Patent is hereby corrected as shown below:

<u>Column 18,</u>
Lines 14, 18, 23, 29, 32, 36, 39 and 42, please delete "11" and insert therefor -- 12 --

Signed and Sealed this

Twenty-first Day of October, 2003

JAMES E. ROGAN
*Director of the United States Patent and Trademark Office*